United States Patent
Machida

(10) Patent No.: US 9,125,232 B2
(45) Date of Patent: Sep. 1, 2015

(54) BASE STATION, COMMUNICATION SYSTEM, AND WIRELESS RESOURCE ALLOCATION METHOD

(71) Applicant: FUJITSU LIMITED, Kawasaki-shi, Kanagawa (JP)

(72) Inventor: Mamoru Machida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 14/066,280

(22) Filed: Oct. 29, 2013

(65) Prior Publication Data

US 2014/0051440 A1 Feb. 20, 2014

Related U.S. Application Data

(63) Continuation of application No. PCT/JP2011/062024, filed on May 25, 2011.

(51) Int. Cl.

| | |
|---|---|
| *H04W 4/00* | (2009.01) |
| *H04W 72/00* | (2009.01) |
| *H04W 88/08* | (2009.01) |
| *H04W 48/20* | (2009.01) |
| *H04W 60/00* | (2009.01) |
| H04W 72/08 | (2009.01) |
| H04W 36/22 | (2009.01) |
| H04W 84/04 | (2009.01) |

(52) U.S. Cl.
CPC .............. *H04W 88/08* (2013.01); *H04W 48/20* (2013.01); *H04W 60/00* (2013.01); *H04W 36/22* (2013.01); *H04W 72/082* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 7,336,956 B2 * | 2/2008 | Halonen et al. | 455/450 |
| 2007/0287464 A1 | 12/2007 | Hamamoto et al. | |
| 2010/0222062 A1 | 9/2010 | Chou et al. | |
| 2011/0003599 A1 * | 1/2011 | Kanzaki et al. | 455/452.2 |
| 2011/0009147 A1 | 1/2011 | Morita et al. | |

FOREIGN PATENT DOCUMENTS

| | | |
|---|---|---|
| JP | 63-232718 | 9/1988 |
| JP | 2005-311931 | 11/2005 |
| JP | 2008-278265 | 11/2008 |
| JP | 2010-246097 | 10/2010 |

(Continued)

OTHER PUBLICATIONS

International Search Report, mailed in connection with PCT/JP2011/062024 and mailed Aug. 30, 2011.

(Continued)

*Primary Examiner* — Erika A Washington
(74) *Attorney, Agent, or Firm* — Fujitsu Patent Center

(57) ABSTRACT

A base station provided with an interference judging unit judging if an amount of interference which occurs between the base station and a peripheral cell in wireless resources, allocated to a mobile station, is in an allowable range, a registering unit receiving a reception operation for registering a mobile station in a storage device which the base station can access, and a resource control unit allocating wireless resources to only mobile stations which are registered at the registering unit and changing the wireless resources to be allocated to the registered mobile station, when the amount of the interference is not in the allowable range.

10 Claims, 24 Drawing Sheets

(56) References Cited

FOREIGN PATENT DOCUMENTS

| WO | 2005/086516 | 9/2005 |
| WO | 2009/119173 | 10/2009 |
| WO | 2010/067404 | 6/2010 |

OTHER PUBLICATIONS

JPOA—Office Action of JP Patent Application No. 2013-516137 dated Dec. 2, 2014, with English Translation of the Office Action.
JPOA—Office Action of Japanese Patent Application No. 2013-516137 dated Jun. 23, 2015, with English translation.

* cited by examiner

FIG.8A

| PATTERN NUMBER | RESOURCE 221 | RESOURCE 222 |
|---|---|---|
| 1 | MOBILE STATION A | MOBILE STATION B |
| 2 | MOBILE STATION B | MOBILE STATION A |

FIG.8B

| PATTERN NUMBER | RESOURCE 241 | RESOURCE 242 | RESOURCE 243 | RESOURCE 244 |
|---|---|---|---|---|
| 3 | MOBILE STATION A | MOBILE STATION B | UNUSED | UNUSED |
| 4 | MOBILE STATION B | MOBILE STATION A | UNUSED | UNUSED |
| 5 | UNUSED | UNUSED | MOBILE STATION A | MOBILE STATION B |
| 6 | UNUSED | UNUSED | MOBILE STATION B | MOBILE STATION A |
| 7 | MOBILE STATION A | UNUSED | MOBILE STATION B | UNUSED |
| 8 | MOBILE STATION B | UNUSED | MOBILE STATION A | UNUSED |
| 9 | UNUSED | MOBILE STATION A | UNUSED | MOBILE STATION B |
| 10 | UNUSED | MOBILE STATION B | UNUSED | MOBILE STATION A |
| 11 | MOBILE STATION A | UNUSED | UNUSED | MOBILE STATION B |
| 12 | MOBILE STATION B | UNUSED | UNUSED | MOBILE STATION A |
| 13 | UNUSED | MOBILE STATION A | MOBILE STATION B | UNUSED |
| 14 | UNUSED | MOBILE STATION B | MOBILE STATION A | UNUSED |

FIG.9A

| PATTERN NUMBER | RESOURCE 200 |
|---|---|
| 1 | MOBILE STATION A |

FIG.9B

| PATTERN NUMBER | RESOURCE 221 | RESOURCE 222 |
|---|---|---|
| 2 | MOBILE STATION A | UNUSED |
| 3 | UNUSED | MOBILE STATION A |

FIG.9C

| PATTERN NUMBER | RESOURCE 241 | RESOURCE 242 | RESOURCE 243 | RESOURCE 244 |
|---|---|---|---|---|
| 4 | MOBILE STATION A | UNUSED | UNUSED | UNUSED |
| 5 | UNUSED | MOBILE STATION A | UNUSED | UNUSED |
| 6 | UNUSED | UNUSED | MOBILE STATION A | UNUSED |
| 7 | UNUSED | UNUSED | UNUSED | MOBILE STATION A |

FIG.15A

| TOTAL RESOURCES 300 |
|---|
| MOBILE STATION 3b |

FIG.15B

| RESOURCES 321 | RESOURCES 322 |
|---|---|
| UNUSED RESOURCES | MOBILE STATION 3b |

FIG.15C

| RESOURCES 321 | RESOURCES 322 |
|---|---|
| MOBILE STATION 3b | UNUSED RESOURCES |

FIG.15D

| RESOURCES 341 | RESOURCES 342 | RESOURCES 343 | RESOURCES 344 |
|---|---|---|---|
| MOBILE STATION 3b | UNUSED RESOURCES | UNUSED RESOURCES | UNUSED RESOURCES |

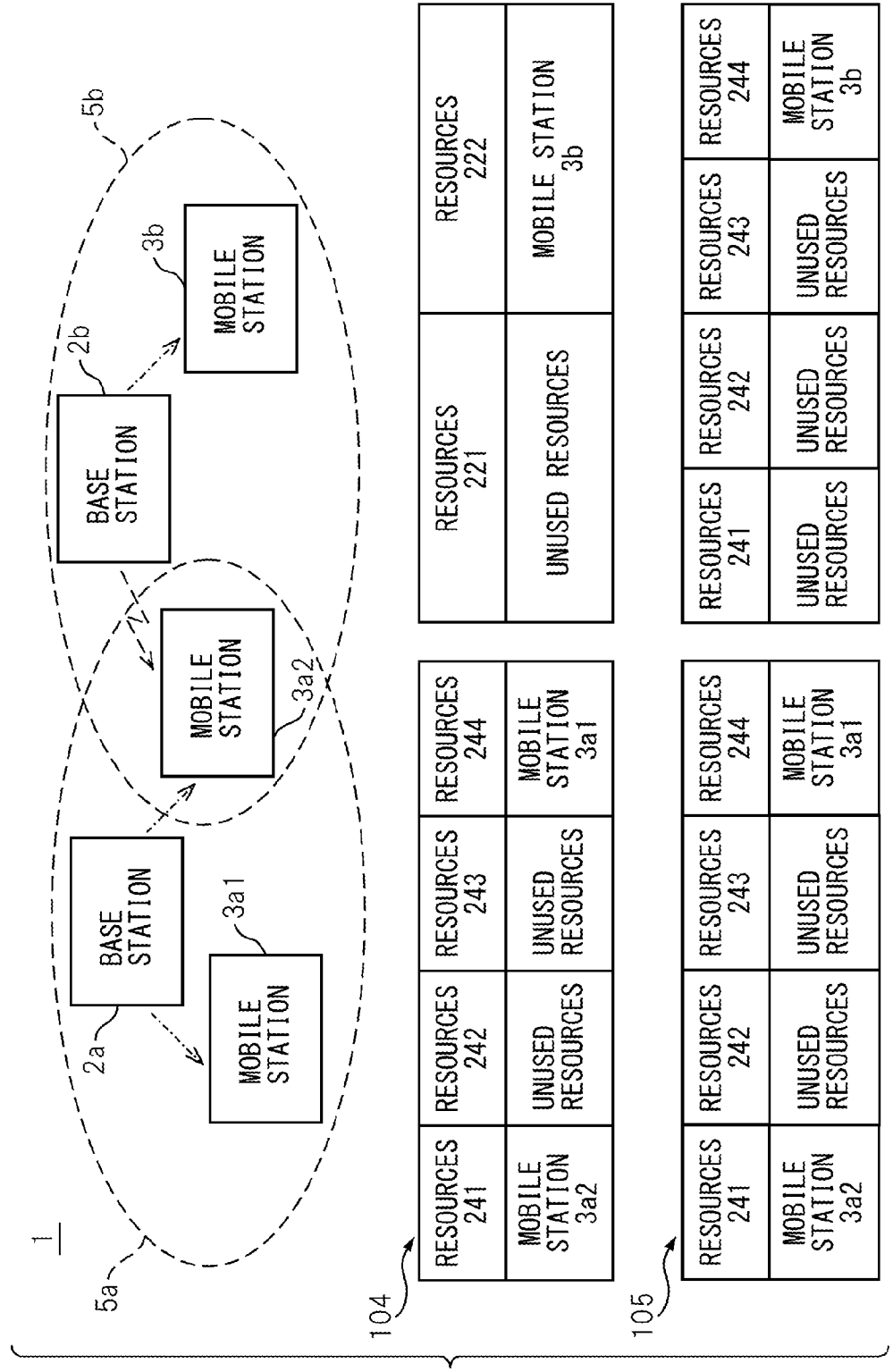

FIG.18A

| SETTING | SETTING CONTENT |
|---|---|
| ON | SECURE UNUSED RESOURCES |
| OFF | DO NOT SECURE UNUSED RESOURCES |

FIG.18B

| SETTING | SETTING CONTENT |
|---|---|
| 1 | SECURE 1/2 OF TOTAL RESOURCES AS UNUSED RESOURCES |
| 2 | SECURE 1/4 OF TOTAL RESOURCES AS UNUSED RESOURCES |
| 3 | SECURE 1/8 OF TOTAL RESOURCES AS UNUSED RESOURCES |
| ⋮ | ⋮ |
| n | SECURE $1/(2^n)$ OF TOTAL RESOURCES AS UNUSED RESOURCES |

BASE STATION, COMMUNICATION SYSTEM, AND WIRELESS RESOURCE ALLOCATION METHOD

CROSS-REFERENCE TO RELATED APPLICATION

This application is a continuation application of International Application PCT/JP2011/062024, filed on May 25, 2011 and designating the U.S., the entire contents of which are incorporated herein by reference.

FIELD

The embodiments which are discussed in the Description relate to the art of avoiding inter-cell interference in a mobile communication system.

BACKGROUND

As art for avoiding inter-cell interference, static FFR (fractional frequency reuse) and ICIC (inter-cell interference coordination) are known.

Note that, in a cordless telephone system, it is known that a main control unit of a handset or a main control unit of a base hold part holds a part of a plurality of channels used for communication, as working channels, among a plurality of channels holds the remaining channels of the plurality of channels as spare channels, divide all of the channels into a plurality of channel groups according to the level of the frequency, and, when a faulty channel arises, replaces the faulty channel with the spare channel of a channel group, among the plurality of channel groups, to which the faulty channel does not belong.

Further, in a femtocell base station which forms a femtocell coverage area, there is known the method of avoiding interference by receiving an allocation of resources held in reserve and controlling signaling and data transmission. In this method, the allocation is received from a macrocell base station which forms the coverage area of the macrocell. A femtocell base station is located inside the coverage area of the macrocell. Further, the femtocell includes part of the coverage area of the macrocell.

This method further includes enabling usage of resources which are held in reserve by the femtocell base station in response to reception of an allocation and avoiding interference relating to communication between the femtocell and macrocell. This method further includes preventing usage of resources which are held in reserve by the macrocell base station in response to allocation of resources which are held in reserve.

RELATED ART LIST

Patent Document 1: Japanese Laid-Open Patent Publication No. 2005-311931A

Patent Document 2: Japanese Laid-Open Patent Publication No. 2010-246097A

Static FFR and ICIC are operated based on a system where the position of the antenna of the base station and the position of the cell being fixed. Therefore, in the case where a base station is not mounted in such system, there is a possibility that inter-cell interference cannot be avoided even if using the Static FFR and ICIC. As an example of such a base station, for example, there is a small-sized base station which forms a femtocell.

Therefore, it is preferable to provide a technique for determining an allocation of wireless resources, which reduces inter-cell interference, in a situation where the position of the antenna of the base station and the position of the cell are not fixed. Further, it is desirable to be able to complete the processing for allocation quickly when determining an allocation of wireless resources by which inter-cell interference can be reduced.

SUMMARY

According to one aspect of the apparatus, there is provided a base station. The base station is provided with an interference judging unit which judges if an amount of interference which occurs between the base station and a peripheral cell in wireless resources, allocated to a mobile station, is in an allowable range, a registering unit which receives a reception operation for registering mobile stations in a storage device which the base station can access, and a resource control unit which allocates wireless resources to only mobile stations registered at the registering unit and changes the wireless resources allocated to the registered mobile station which is, when the amount of interference is not in the allowable range.

According to another aspect of the apparatus, there is provided a communication system which has a base station and a mobile station. The base station is provided with a first interference judging unit which judges if an amount of interference which occurs between the base station and a peripheral cell in wireless resources, allocated to the mobile station, is in an allowable range, a registering unit which receives a reception operation to register mobile stations in a storage device which the base station can access, and a resource control unit which allocates wireless resources to only mobile stations registered at the registering unit and changes the wireless resources, allocated to the registered mobile station, when the amount of interference is not in the allowable range. The mobile station is provided with a second interference judging unit which judges if an amount of interference which occurs between the base station and a peripheral cell in the wireless resources, allocated to the base station, is in an allowable range and an output unit which outputs an alarm when a time period, where the amount of interference is not in an allowable range, exceeds a threshold value.

According to one aspect of a method, there is provided a wireless resource allocation method comprising receiving, in advance, a registration operation to register mobile stations, which are permitted to be connected to a base station, and registering the mobile stations in a storage device which the base station can access, measuring the amount of interference which occurs between the base station and a peripheral cell in wireless resources which are allocated by the base station to a mobile station, and allocating wireless resources to only mobile stations registered in the storage device among the mobile stations in a cell formed by the base station and changing the wireless resources allocated to the registered mobile station, when the amount of the measured interference is not in an allowable range.

The object and advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF DRAWINGS

FIGS. 8A and 8B are explanatory views of one example of an allocation pattern of wireless resources to two mobile stations.

FIGS. 9A to 9C are explanatory views of one example of an allocation pattern of wireless resources to one mobile station.

FIGS. 15A to 15D are views which illustrate examples of the case where unused resources increase.

FIG. 16 is a view which illustrates one example of wireless resource allocation at a downlink (part 3).

FIGS. 18A and 18B are explanatory views of examples of settings by a designating unit.

DESCRIPTION OF EMBODIMENTS

According to the disclosed apparatus and method, there is provided a base station and method which determines an allocation of wireless resources which reduces the inter-cell interference in a situation where the position of the antenna of the base station and the position of the cell are not fixed. Further, according to the disclosed apparatus and method, the processing time of the processing for determination of an allocation of wireless resources which reduces the inter-cell interference becomes shorter.

1. Configuration of Communication System

Figure 1:
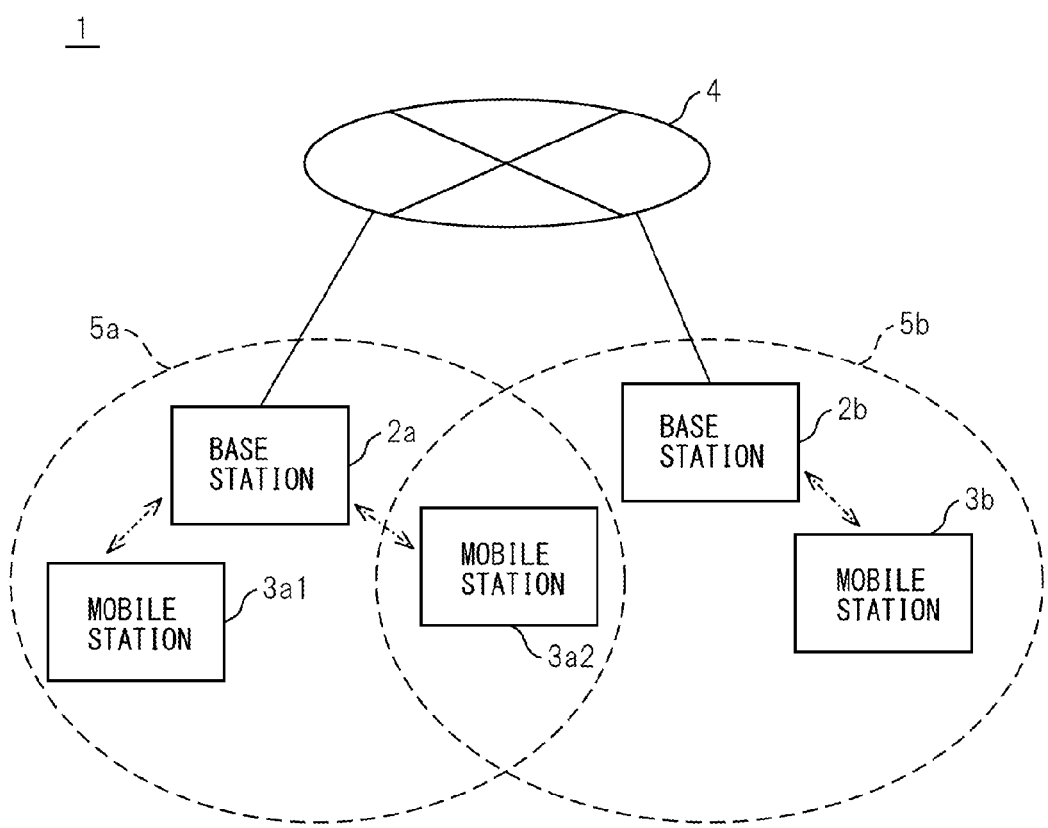
FIG. 1 is a view which illustrates an example of the overall configuration of a communication system.

Below, referring to the attached drawings, preferable embodiments will be explained. FIG. 1 is a view which illustrates an example of the overall configuration of a communication system. A communication system 1 is provided with base stations 2a and 2b and mobile stations 3a1, 3a2, and 3b. Further, in the following explanation, the base stations 2a and 2b will sometimes be referred to all together as the "base station 2". Further, the mobile stations 3a1, 3a2, and 3b will sometimes be referred to all together as the "mobile station 3".

The base stations 2 may be, for example, small-sized base stations which form femtocells. Such small-sized base stations may be, for example, the HeNB (Home eNB) based on the LTE (long-term evolution) whose specifications are determined by the 3GPP. Small-sized base stations, for example, include ones which users can install in the home.

The mobile stations 3 may also be, for example, mobile phones, mobile data terminals, personal computers, etc. For example, the mobile stations 3 may be user equipment (UE) based on the LTE.

The base stations 2 connect to mobile stations 3 through wireless communication links and connect the mobile stations 3 and a ground side communication network 4. The communication network 4 may be, for example, a public network such as the Internet or may be a core network which is operated by a telecommunication carrier. Reference numerals 5a and 5b schematically illustrate the ranges of cells which are formed by the base stations 2a and 2b. In the example which is illustrated in FIG. 1, mobile stations 3a1 and 3a2 are located in the cell 5a of the base station 2a and connect to the base station 2a. The mobile station 3b is located inside the cell 5b of the base station 2b and connects to the base station 2b. In all of the explanations of operation in the embodiments shown below, unless particularly explained, the above mentioned example of connections in the system will be used.

2. First Embodiment

Figure 2:
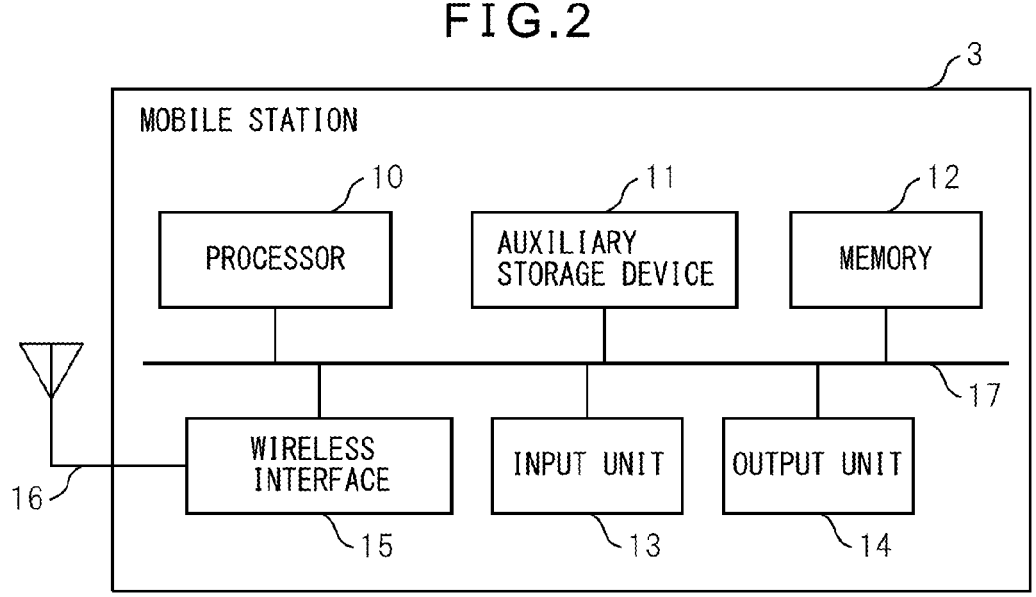
FIG. 2 is a view which illustrates one example of the hardware configuration of a mobile station.

Next, the configuration and functions of a base station 2 and mobile station 3 in each embodiment will be explained. FIG. 2 is a view which shows one example of the hardware configuration of a mobile station 3. The mobile station 3 is provided with a processor 10, auxiliary storage device 11, memory 12, input unit 13, output unit 14, wireless interface 15, antenna 16, and data bus 17. The mobile station 3 in another embodiment which will be explained below also may have a similar hardware configuration.

The processor 10 runs a control program which is stored in the auxiliary storage device 11 so as to perform the different processings for control of the operation of a mobile station 3 or the later explained processing which is performed, at the mobile station 3 side, for allocation of wireless resources by the base station 2. The auxiliary storage device 11 stores the above control program. The auxiliary storage device 11 may include, as the storage element, a nonvolatile memory or read only memory (ROM) or the like.

The memory 12 stores running programs which are executed by the processor 10 and data which is temporarily used by these programs. The memory 12 may include a random access memory (RAM). The input unit 13 is an input device which receives input operations by the user. The input unit 13, for example, is a keypad, keyboard, pointing device, touch panel, etc.

The output unit 14 is an output device which outputs a signal processed by a mobile station 3. For example, the output unit 14 may be a display device which visually displays the information, which was processed by the mobile station 3, to a user. The output unit 14, for example, may be a liquid crystal display, CRT (cathode ray tube) display, or organic electroluminescence display. Alternatively, the output unit 14 may be a speaker which outputs an audio signal or a drive circuit for the same. The wireless interface 15 sends and receives a wireless signal through an antenna 16 and performs processing for wireless communication with the base station 2. The above component elements 10 to 15 are electrically connected by a data bus 17.

Note that, the hardware configuration which is illustrated in FIG. 2 is just one hardware configuration for realizing a mobile station 3. In this Description, any other hardware configuration may be employed so long as one which executes the processing described below.

Figure 3:
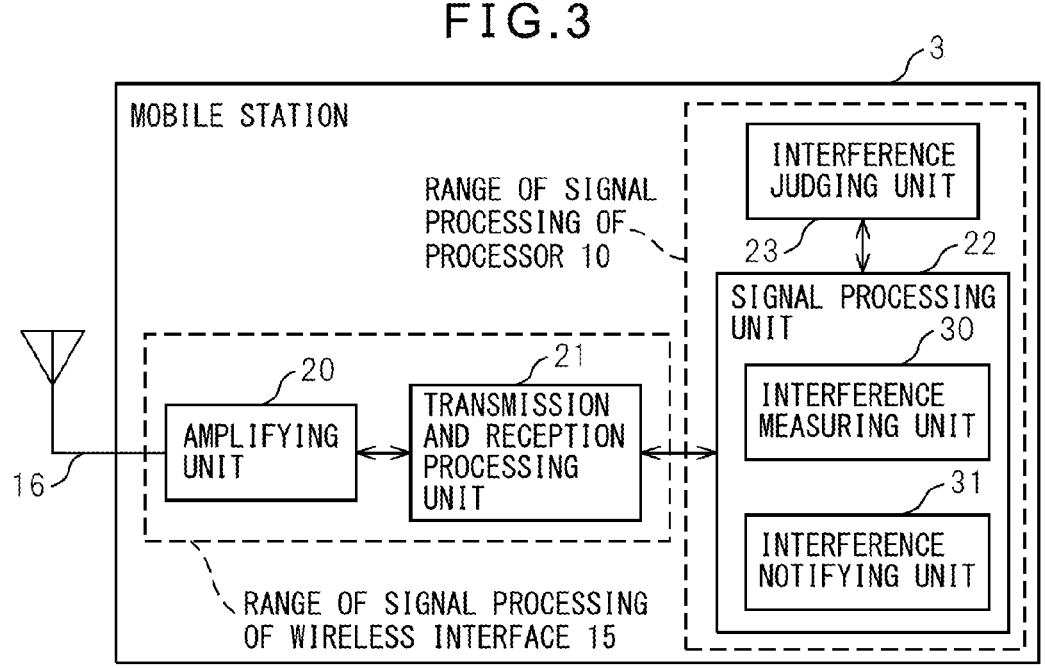
FIG. 3 is a view of the configuration of a first example of a mobile station.

FIG. 3 is a view of the configuration of a first example of a mobile station 3. The processor 10 of FIG. 2 operates in coordination with other hardware elements of the mobile station 3, in accordance with need, according to a program stored in the auxiliary storage device 11 so as to process information by the illustrated component elements of the mobile station 3. The same is true in other embodiments as well. Note that, FIG. 3 illustrates primarily the functions which are related to the following explanation.

The mobile station 3 is provided with an amplifying unit 20, transmission and reception processing unit 21, signal processing unit 22, and interference judging unit 23. The amplifying unit 20 amplifies a signal which is sent and received by the antenna 16. The transmission and reception processing unit 21 performs processing for demodulation of the reception signal which is received at the antenna 16 and processing for modulation of the transmission signal which is output from the signal processing unit 22. In one embodiment, the signal processing by the amplifying unit 20 and the transmission and reception processing unit 21 may be performed by the wireless interface 15 which is illustrated in FIG. 2. Further, the signal processing by the signal processing unit 22 and the interference judging unit 22 may be performed by the processor 10. In another embodiment, part of the signal processing by the transmission and reception processing unit 21 may be performed by the processor 10. Further, part or all of the signal processing by the signal processing unit 22 may be performed by the wireless interface 15.

The signal processing unit 22 performs processing for communication according to communication protocol between the base station 2 and the mobile station 3 and processing for measurement of the amount of interference which the reception signal of the mobile station 3 suffers from. The signal processing unit 22 is provided with an interference measuring unit 30 and an interference notifying unit 31. The interference measuring unit 30 measures the amount of interference which the reception signal of the mobile station 3 suffers from at the wireless resources for downlink use allocated by the base station 2 to the mobile station 3. For example, the interference measuring unit 30 may measure the signal power of the reception signal which is transmitted from the base station 2 to the mobile station 3 and the interference power and then it measures the ratio (SIR: signal-to-interference) as the amount of interference.

The interference judging unit 23 monitors the measured values from the interference measuring unit 30 and notifies the interference notifying unit 31 of the fact that, when the measured value is over the allowable range, the interference value is not in the allowable range. The interference notifying unit 31 generates an interference notification signal which provides notification of the fact that the amount of interference, which the reception signal of the mobile station 3 suffers from at the downlink, is not in the allowable range. The interference notifying unit 31 transmits the interference notification signal to the base station 2.

Figure 4:
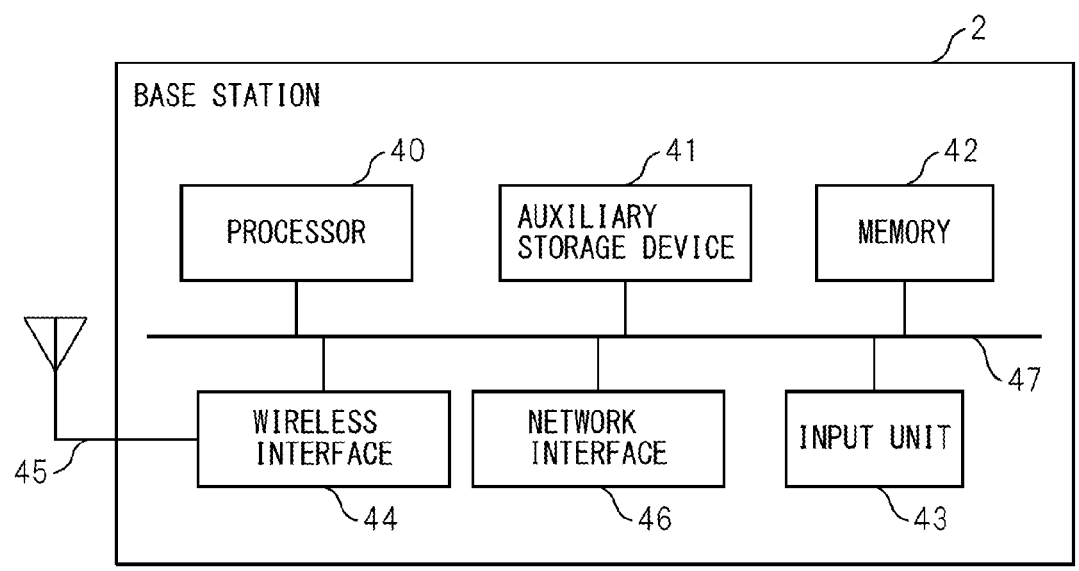
FIG. 4 is a view which illustrates one example of the hardware configuration of a base station.

Next, the configuration and the function of the base station 2 will be explained. FIG. 4 is a view which illustrates one example of the hardware configuration of the base station 2. The base station 2 is provided with a processor 40, auxiliary storage device 41, memory 42, input unit 43, wireless interface 44, antenna 45, network interface 46, and data bus 47. The base station 2 in another embodiment explained below has a similar hardware configuration.

The processor 40 runs a control program which is stored in the auxiliary storage device 41 so as to execute each processing for controlling the operation of the base station 2 and the later explained processing for allocation of wireless resources to the mobile station 3. The auxiliary storage device 41 stores the above control program. The auxiliary storage device 41 may include, as the storage element, a nonvolatile memory, read only memory, etc.

The memory 42 stores a running program which is being executed by the processor 40 and data which is temporarily used by this program. The memory 42 may include a random access memory. The input unit 43 is an input device which receives an input operation by the user. The input unit 43 may, for example, be a keypad, keyboard, pointing device, touch panel, etc.

The wireless interface 44 sends and receives a wireless signal through the antenna 45 and performs processing for wireless communication with the mobile station 3. The network interface 26 performs processing for communication with the communication network 4. The component elements 40 to 44 and 46 are electrically connected by the data bus 47.

Note that, the hardware configuration which is illustrated in FIG. 4 is just one of the hardware configurations for realizing the base station 2. It is also possible to employ any other hardware configuration so long as performing the processing which will be described below in the Description.

Figure 5:
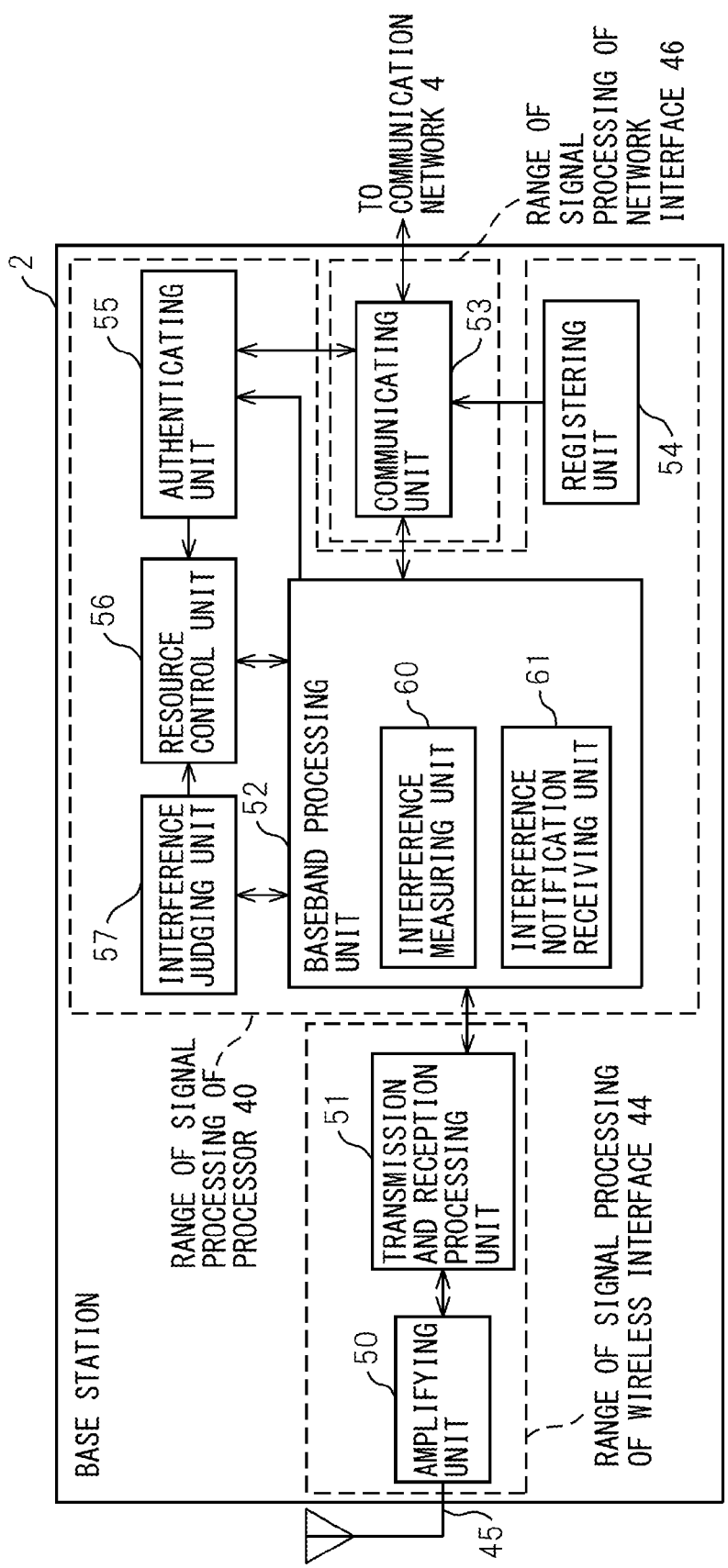
FIG. 5 is a view of the configuration of a first example of a base station.

FIG. 5 is a view of the configuration of a first example of the base station 2. The processor 40 of FIG. 4 operates in coordination with other hardware elements of the base station 2, in accordance with need, according to a program stored in the auxiliary storage device 41 so as to process information by the illustrated component elements of the base station 2. The same is true for other embodiments as well. Note that, FIG. 5 illustrates mainly the functions related to the following explanation.

The base station 2 is provided with an amplifying unit 50, transmission and reception processing unit 51, baseband processing unit 52, communicating unit 53, registering unit 54, authenticating unit 55, resource control unit 56, and interference judging unit 57. The amplifying unit 50 amplifies a signal which is sent and received at the antenna 45. The transmission and reception processing unit 51 performs processing for demodulation of the reception signal received at the antenna 45 and processing for modulation of the transmission signal output from the signal processing unit 45. In one embodiment, the signal processing by the amplifying unit 50 and the transmission and reception processing unit 51 may be performed by the wireless interface 44 which is illustrated in FIG. 4. Further, the signal processing by the baseband processing unit 52, registering unit 54, authenticating unit 55, resource control unit 56, and interference judging unit 57 may be performed by the processor 40. The processing of the communicating unit 53 may be performed by the network interface 46. In another embodiment, part of the signal processing by the transmission and reception processing unit 51 and/or the communicating unit 53 may also be performed by the processor 10. Further, part or all of the signal processing by the baseband processing unit 52 may also be performed by the wireless interface 44.

The baseband processing unit 52 performs signal processing of the baseband signal according to communication protocol between the base station 2 and the mobile station 3 and processing for measurement of the uplink signal received from the mobile station 3. Further, the baseband processing unit 52 receives the interference notification signal transmitted from the mobile station 3. The baseband processing unit 52 is provided with an interference measuring unit 60 and an interference notification receiving unit 61.

The interference measuring unit 60 measures the amount of interference which occurs at the wireless resources for uplink use allocated by the base station 2 to the mobile station 3. The interference notification receiving unit 61 receives the interference notification signal transmitted from the mobile station 3 and outputs the interference notification signal to the interference judging unit 57.

The communicating unit 53 performs signal processing such as protocol conversion for communication through the communication network 4 and provides the results to the base station 2 the function of communication with another information processing system connected to the communication network 4. In one embodiment, the base station 2 can access an external storage device through the communication network 4. The external storage device may be for example a server system.

The registering unit 54 performs processing for registering mobile stations which are permitted to be connected with the base station 2. If the user performs a predetermined registration operation for requesting registration of the mobile station 3 through the input unit 43, the registering unit 54 receives the request. The registering unit 54 registers an identifier of the mobile stations 3 to be registered at an external storage device which can be accessed by the base station 2 through the communication network 4. Note that, a storage device, in which the registering unit 54 registers an identifier of the mobile station 3, may also be provided inside the base station 2.

The authenticating unit 55 judges, when the base station 2 receives a connection request from the mobile station 3, whether the connection is permitted in accordance with whether the mobile station 3 is registered by the registering unit 54 in the storage device. That is, if the mobile station 3 originating the connection request is registered by the registering unit 54, the authenticating unit 55 permits the connection of the mobile station 3 with the base station 2. If the mobile station 3 originating the connection request is not registered, the authenticating unit 55 prohibits the connection of the mobile station 3 with the base station 2.

The resource control unit 56 allocates wireless resources for the downlink and uplink use, to only a mobile station which the authenticating unit 55 has permitted connection to, so as to perform communication between the mobile station 3 and the base station 2. In the following explanation, the allocation of wireless resources for allocating wireless resources to a mobile station 3, connected to the base station 2, will be referred to as "wireless resource allocation".

The interference judging unit 57 monitors the measured values by the interference measuring unit 60 and judges if the amount of interference occurred in the wireless resources for uplink use is in the allowable range. If the amount of interference exceeds the allowable range, the interference judging unit 57 notifies the resource control unit 56 that the amount of interference is not in the allowable range. Further, the interference judging unit 57 judges if the amount of interference, occurred in wireless resources of a downlink allocated to a mobile station 3, has exceeded the allowable range in accordance with the presence of any reception of an interference notification signal transmitted from the mobile station 3. When the amount of interference exceeds the allowable range, the interference judging unit 57 notifies the resource control unit 56 that the amount of interference is not in the allowable range.

When notified by the interference judging unit 57 that the amount of interference at the uplink is not in the allowable range, the resource control unit 56 changes the wireless resource allocation at the uplink so as to search for another wireless resource allocation by which the amount of interference will be kept in the allowable range. Further, when notified by the interference judging unit 57 that the amount of interference at the downlink is not in the allowable range, the resource control unit 56 changes the wireless resource allocation at the downlink so as to search for a wireless resource allocation by which the amount of interference will be kept in the allowable range.

When searching for a wireless resource allocation, the resource control unit 56 repeatedly changes the wireless resource allocation until the notifications from the interference judging unit 57 stop. When the notifications from the interference judging unit 57 stop and if a wireless resource allocation, by which the interference is eliminated, is found, the resource control unit 56 ends the processing for changing the wireless resource allocation.

Figure 6:
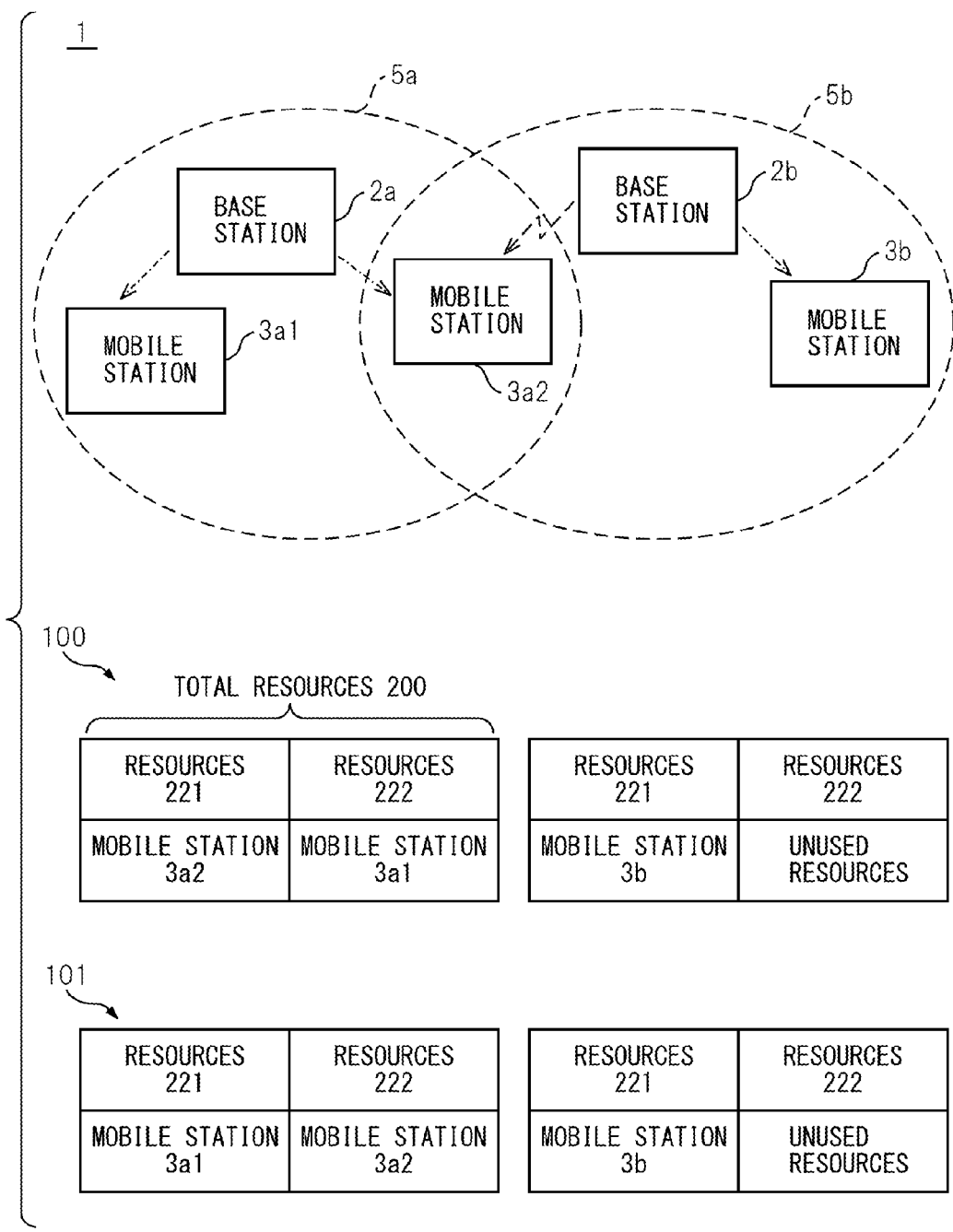
FIG. 6 is a view which illustrates one example of a wireless resource allocation at a downlink (part 1).

Next, the allocation of the wireless resources at a downlink by the base station 2 will be explained. FIG. 6 illustrates one example of the wireless resource allocation at the downlink. In the example of FIG. 6, the mobile station 3a2 connecting with the base station 2a is positioned in the cell 5b formed by the base station 2b. Therefore, a wireless signal transmitted from the base station 2b also reaches the mobile station 3a2. For this reason, if the base station 2b uses the same resources as the wireless resources for downlink use allocated to the mobile station 3a2, the reception signal which the mobile station 3a2 receives from the base station 2a suffers from interference of the transmission signal by the base station 2b.

Reference numerals 100 and 101 illustrate examples of the wireless resource allocation by the base stations 2a and 2b at the downlink. The wireless resources 200 indicates the entire range which is designated, in advance, as the range of wireless resources of the downlink which the base station 2 can allocate to the connected mobile station 3.

In the example of allocation indicated in FIG. 6, the base stations 2a and 2b divide the wireless resources 200, which can be allocated for downlink use, into the two resources 221 and 222. In the following explanation, the resources obtained by dividing the entire range of wireless resources 200, which can be allocated, will be referred to as "partial resources". The same is true for the uplink as well.

In the case of the wireless resource allocation 100, the base station 2a allocates the partial resources 221 to the mobile station 3a2 and allocates the partial resources 222 to the mobile station 3a1. Further, the base station 2b allocates the partial resources 221 to the mobile station 3b but does not allocate the partial resources 222 to the mobile station 3. In the following explanation, the range of resources, which the base station 2 does not allocate to the mobile stations 3, will sometimes be referred to as the "unused resources".

In this state, the partial resources 221 which are allocated to the mobile station 3a2 are also used for the base station 2b, where, interference occurs in the downlink signal which the mobile station 3a2 receives. The base station 2a is notified by the interference notification signal, transmitted from the mobile station 3a2, of the fact that the amount of interference at the downlink is not in the allowable range. On the other hand, the base station 2b, to which the mobile station 3a2 is not connected, is not notified of the occurrence of interference at the downlink. As a result, the base station 2a changes the wireless resource allocation at the downlink.

The wireless resource allocation 101 represents the state where interference at the downlink is eliminated. The partial resources 221, which the base station 2b uses, differ from the partial resources 222 allocated to the mobile station 3a2. Therefore, no interference occurs at the downlink signal which the mobile station 3a2 receives.

Figure 7:
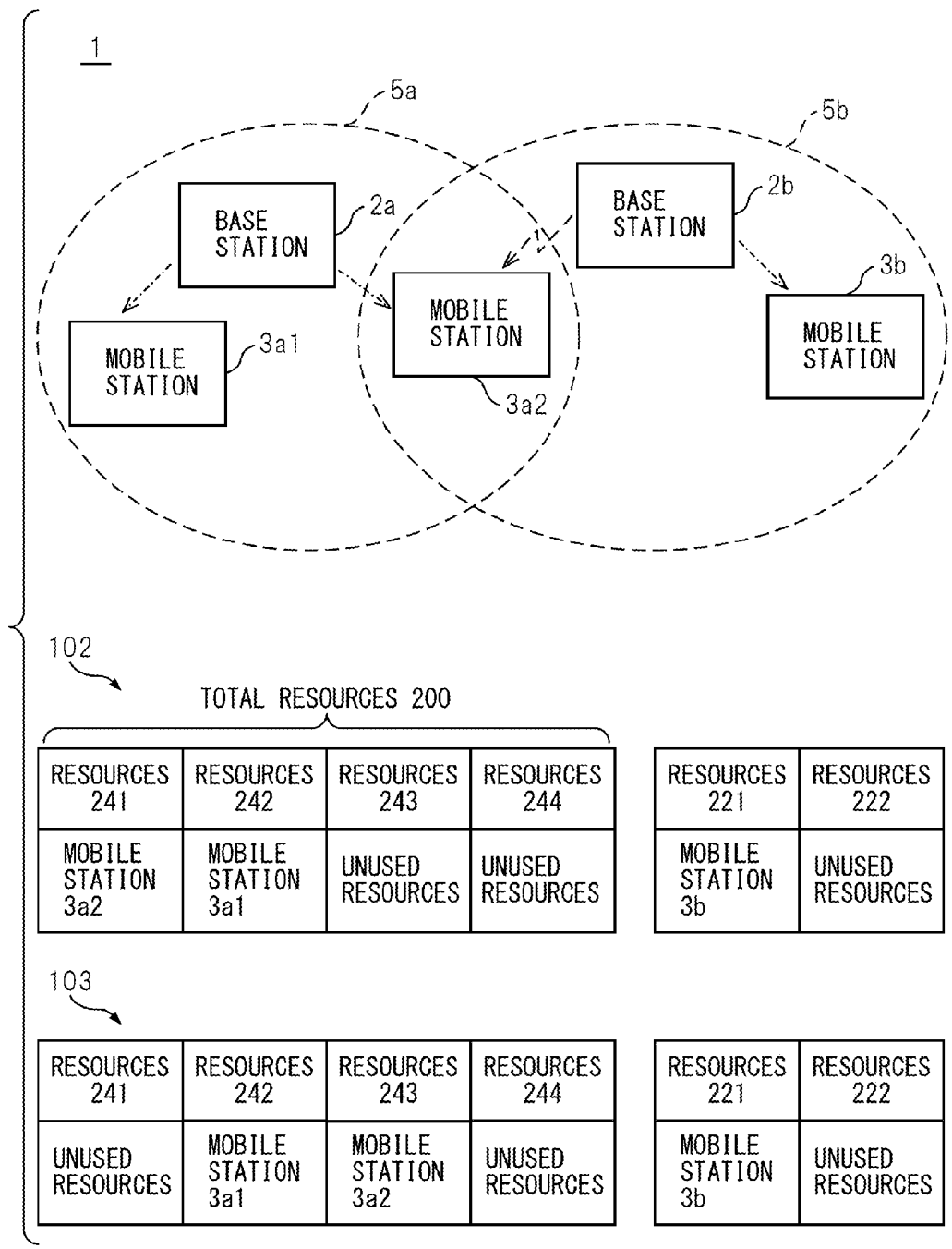
FIG. 7 is a view which illustrates one example of a wireless resource allocation at a downlink (part 2).

FIG. 7 is a view which illustrates another example of allocation of wireless resources at the downlink. The base station 2a divides the wireless resources 200 into four (4) partial resources 241 to 244, the number "4" is greater than "2" which is the number of the mobile stations being connected to the base station. For this reason, two of the partial resources 241 to 244 become unused resources. It is assumed, here, that the partial resources 241 and 242 have overlapping parts with the partial resources 221, while the partial resources 243 and 244 have overlapping parts with the partial resources 222.

In the case of the wireless resource allocation 102, the base station 2a allocates the partial resources 241 to the mobile station 3a2 and the partial resources 242 to the mobile station 3a1. Further, the base station 2b allocates the partial resources 221 to the mobile station 3b. The partial resources 241 allocated to the mobile station 3a2 overlap the partial resources 221 which the base station 2b uses, so interference occurs at the downlink signal which the mobile station 3a2 receives.

As a result, the base station 2a changes the wireless resource allocation at the downlink. When the wireless resource allocation is changed to the state of reference numeral 103, the overlap of the partial resources 243 allocated to the mobile station 3a2 and the partial resources 221 which the base station 2b uses is eliminated, so interference of the downlink signal is eliminated.

Next, examples of the patterns of wireless resource allocation at the time of allocating wireless resources 200 by the base station 2 will be explained. FIG. 8A and FIG. 8B are illustrations of allocation patterns of wireless resources where the wireless resources 200 are allocated to two mobile stations A and B. FIG. 8A illustrates a pattern which divides the wireless resources 200 into two partial resources 221 and 222 and allocates these respectively to the two mobile stations A and B. In one embodiment, the allocation patterns are respectively assigned with unique pattern numbers.

For example, the allocation pattern of the pattern number 1 allocates the partial resources 221 to the mobile station A and allocates the partial resources 222 to the mobile station B. The allocation pattern of the pattern number 2 allocates the partial resources 221 to the mobile station B and allocates the partial resources 222 to the mobile station A. In the allocation pattern of FIG. 8A, unused resources are not secured.

FIG. 8B shows a pattern which divides the wireless resources 200 into four partial resources 241 to 244 and allocates them to the two mobile stations A and B. For example the allocation pattern of the pattern number 3 allocates the partial resources 241 and 242 to the mobile stations A and B respectively and makes the partial resources 243 and 244 unused resources. Further, the allocation pattern of the pattern number 7 allocates the partial resources 241 and 243 to the mobile stations A and B respectively and makes the partial resources 242 and 244 unused resources. In another embodiment, allocation patterns with respect to the case of using other natural numbers "n", other than two and four, for dividing the wireless resources 200 may be similarly determined.

FIG. 9A to FIG. 9C are illustrations of allocation patterns which allocate wireless resources 200 to a single mobile station A. In the allocation pattern of the pattern number 1 which is illustrated in FIG. 9A, the entire range of the wireless resources 200 is allocated to a single mobile station A. Therefore, in the pattern of FIG. 9A, unused resources are not secured.

The allocation patterns of FIG. 9B divide the wireless resources 200 into two partial resources 221 and 222 and allocate either of them to the mobile station A. For example, the allocation pattern of the pattern number 2 allocates the partial resources 221 to the mobile station A and makes the partial resources 222 the unused resources. The allocation pattern of the pattern number 3 allocates the partial resources 222 to the mobile station A and makes the partial resources 221 the unused resources.

The allocation patterns of FIG. 9C divide the wireless resources 200 into four partial resources 241 to 244 and allocate either of them to the mobile station A. For example the allocation pattern of the pattern number 4 allocates the partial resources 241 to the mobile station A and makes the partial resources 242 to 244 unused resources. The allocation pattern of the pattern number 6 allocates the partial resources 243 to the mobile station A and makes the partial resources 241, 242, and 244 unused resources. In another embodiment, it is possible to similarly set the allocation patterns when dividing the wireless resources 200 by another natural number "n" other than two and four.

In one embodiment, the resource control unit 56 of the base station 2 determines a plurality of allocation patterns of wireless resources and determines in advance the order of the allocation patterns. When searching for a wireless resource allocation, the resource control unit 56 successively selects a pattern from the plurality of allocation patterns in accordance with the above order for use for the wireless resource allocation to thereby switch the wireless resource allocation. For example, the resource control unit 56 successively changes the value of a variable according to a predetermined procedure and uses the allocation pattern of the pattern number which corresponds to the value of the variable at each time for the wireless resource allocation. In one embodiment, the resource control unit 56 changes the value of the variable in an ascending order and returns the value of the variable to the minimum value of the pattern number at the time when the value of the variable reaches the maximum value of the pattern number to thereby make the value of the variable loop.

Figure 10:
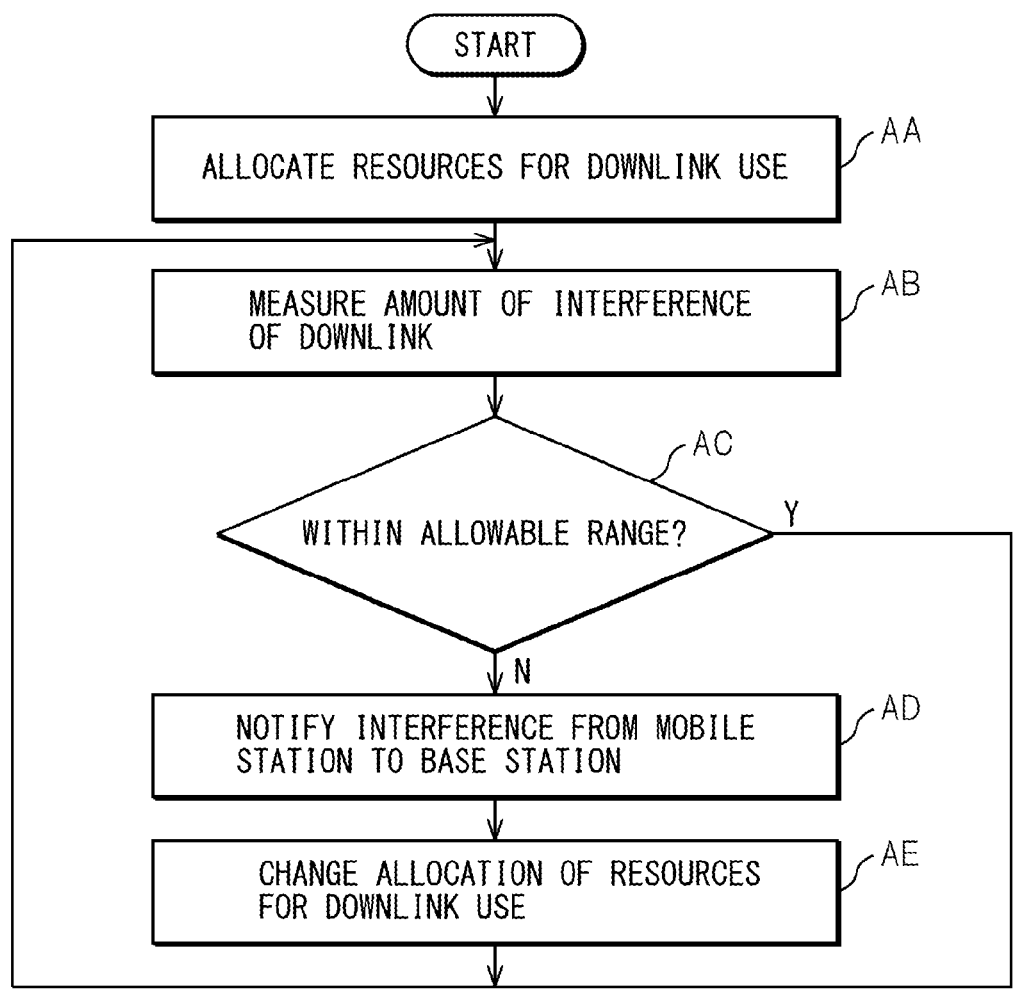
FIG. 10 is an explanatory view of wireless resource allocation processing at a downlink.

Next, referring to FIG. 10, allocation of the wireless resources at the downlink by the base station 2 will be explained. Note that, in another embodiment, the following operations AA to AE may also be steps.

In the operation AA, the resource control unit 56 of the base station 2 allocates the wireless resources for communication of the downlink between the mobile station 3 and the base station 2 to only a mobile station 3 for which connection is permitted by the authenticating unit 55. In an operation AB, the interference measuring unit 30 of the mobile station 3 measures the amount of interference which occurs at the wireless resources for downlink use which the base station 2 allocates.

In the operation AC, the interference judging unit 23 judges if the measured value is in the allowable range. If the measured value is in the allowable range (operation AC: Y), the processing returns to the operation AB. If the measured value is not in the allowable range (operation AC: N), the processing proceeds to the operation AD. In the operation AD, the interference notifying unit 31 transmits the interference notification signal to the base station 2.

In the operation AE, the interference judging unit 57 of the base station 2 judges that the amount of interference occurred at the wireless resources of the downlink allocated to the mobile station 3 has exceeded the allowable range, in response to reception of the interference notification signal. The resource control unit 56 changes the wireless resource allocation at the downlink.

After that, the processing returns to the operation AB. The change of the wire resource allocations by the operations AB to AE is repeated until the amount of interference, occurred at the wireless resources of the downlink allocated to the mobile stations 3, falls in the allowable range.

Figure 11:
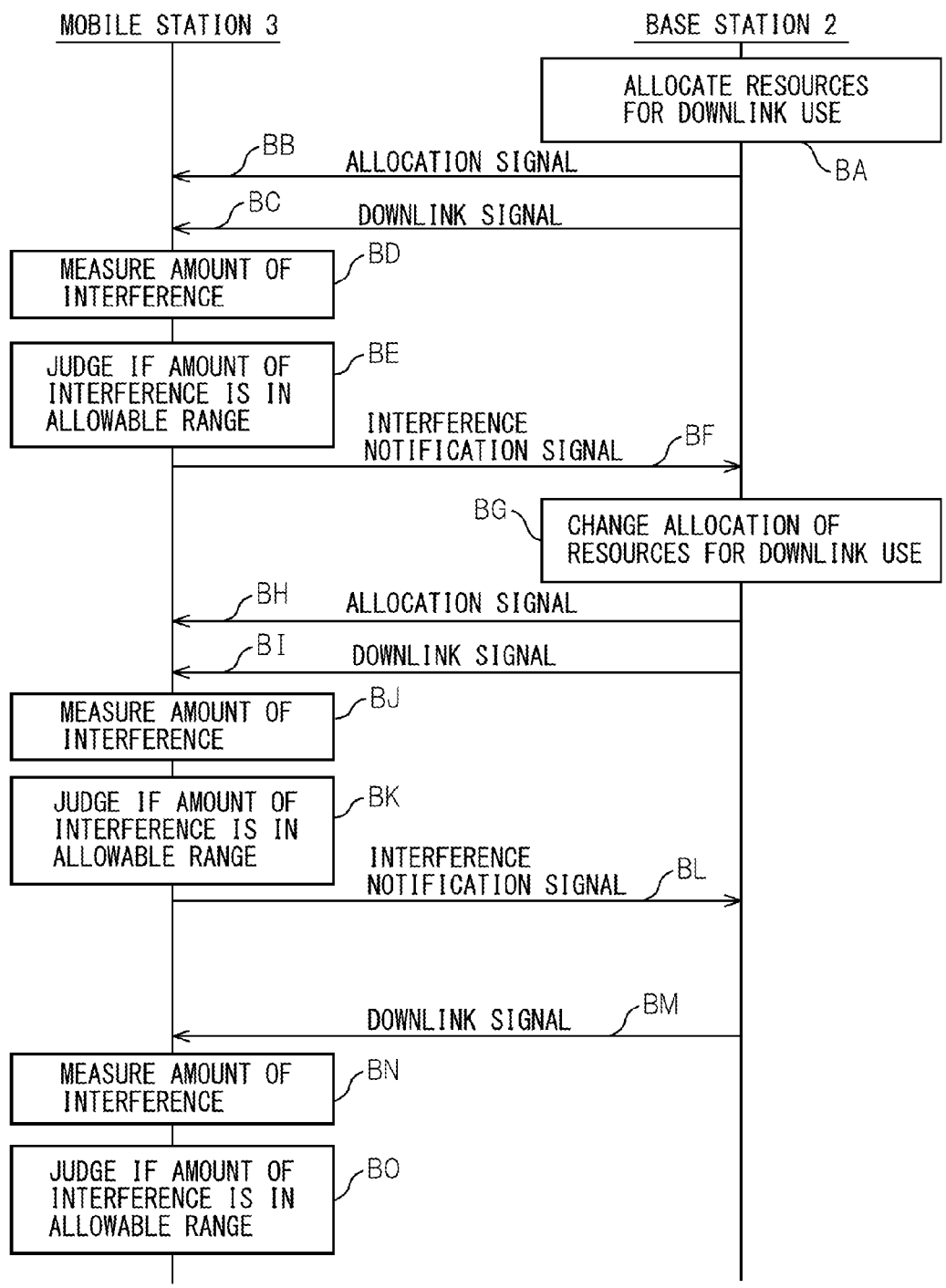
FIG. 11 is a signal sequence chart in the processing of FIG. 10.

Referring to FIG. 11, the sequence of signals which are transmitted between the base station 2 and the mobile station 3 in the processing of FIG. 10 will be explained. Note that, in another embodiment, the following operations BA to BO may also be steps.

In the operation BA, the resource control unit 56 of the base station 2 allocates wireless resources for communication at the downlink between the mobile station 3 and the base station 2. In the operation BB, the baseband processing unit 52 of the base station 2 generates a control signal which notifies the wireless resources to be allocated to the mobile station 3, that is, an allocation signal, and transmits the allocation signal to the mobile station 3. In the operation BC, the baseband processing unit 52 generates a downlink signal and transmits the signal to the mobile station 3.

In the operation BD, the interference measuring unit 30 of the mobile station 3 measures the amount of interference which is suffered by the downlink signal received in the operation BC. In the operation BE, the interference judging unit 23 judges if the measured value is in the allowable range. If the measured value is not in the allowable range, in the operation BF, the interference notifying unit 31 transmits the interference notification signal to the base station 2.

In the operation BG, the interference judging unit 57 of the base station 2 judges that the amount of interference, occurred at the wireless resources of the downlink, has exceeded the allowable range. The resource control unit 56 changes the wireless resource allocation at the downlink.

In the operation BH, the baseband processing unit 52 of the base station 2 transmits, to the mobile station 3, the allocation signal which notifies the wireless resources after change of the allocation. In the operation BI, the baseband processing unit 52 transmits the downlink signal to the mobile station 3.

In the operation BJ, the interference measuring unit 30 of the mobile station 3 measures the amount of interference which is suffered by the downlink signal received at the operation BI. In the operation BK, the interference judging unit 23 judges if the measured value is in the allowable range. If the measured value is not in the allowable range, in the operation BL, the interference notifying unit 31 transmits the interference notification signal to the base station 2. After that, processing similar to the operations BG to BL is repeated and the wireless resource allocation of the downlink is repeatedly changed until the measured value becomes within the allowable range.

In the operation BN, the interference measuring unit 30 of the mobile station 3 measures the amount of interference which is suffered by the downlink signal received in the operation BM. The unit 30 measures the amount of interference which occurs in the wireless resources of the downlink use. In the operation BO, when the interference judging unit 23 judges that the measured value is in the allowable range, the change of the wireless resource allocation is ended.

Figure 12:
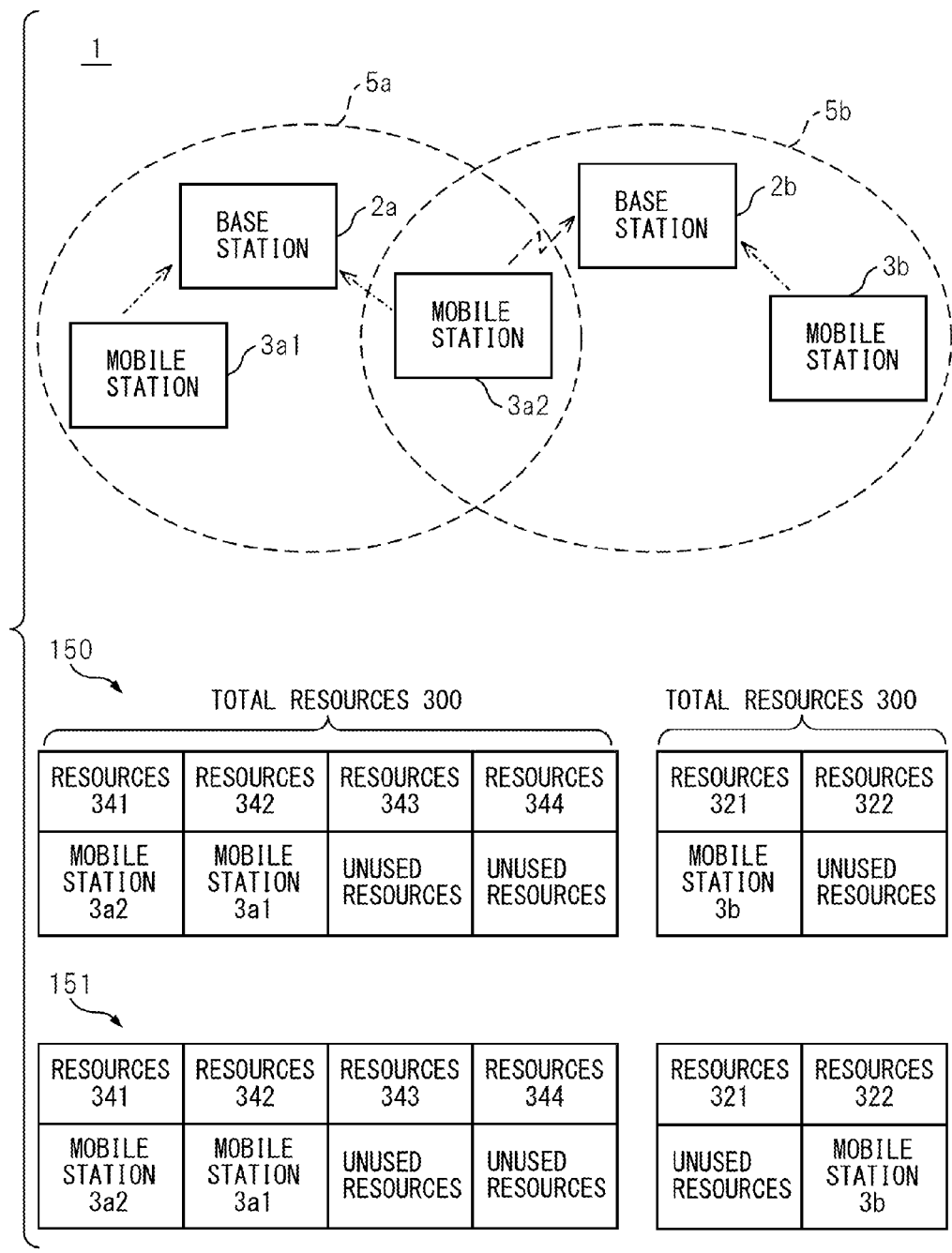
FIG. 12 is a view which illustrates one example of wireless resource allocation at an uplink.

Next, the allocation of the wireless resources at the uplink by the base station 2 will be explained. FIG. 12 illustrates an example of the allocation of wireless resources at the uplink. In the example of FIG. 12, the wireless signal which is transmitted from the mobile station 3a2 reaches the base station 2b as well. For this reason, if the wireless resources for uplink use allocated to the mobile station 3a2 and the wireless resources for uplink use which the base station 2b allocates to the mobile station 3b overlap, the signal which the base station 2b receives from the mobile station 3b suffers from interference of the transmission signal by the mobile station 3a2.

Reference numerals 150 and 151 indicate examples of the wireless resource allocations at the uplink by the base stations 2a and 2b. The wireless resources 300 indicate the entire range which is designated, in advance, as the range of wireless resources of the uplink which the base station 2 can allocate to the mobile stations 3 being connected thereto.

The base station 2a divides the wireless resources 300 into four partial resources 341 to 344. The base station 2b divides the wireless resources 300 into two partial resources 321 to 322. The partial resources 341 and 342 have portions which overlap the partial resources 321, while the partial resources 343 and 344 have portions which overlap the partial resources 322.

In the case of the wireless resource allocation 150, the base station 2a allocates the partial resources 341 to the mobile station 3a2 and allocates the partial resources 342 to the mobile station 3a1. Further, the base station 2b allocates the partial resources 321 to the mobile station 3b. The partial resources 341 which are allocated to the mobile station 3a2 overlap the partial resources 321 which are allocated to the mobile station 3b, so the signal, which the base station 2b receives from the mobile station 3b, suffers from interference of the transmission signal by the mobile station 3a2.

The base station 2b uses the interference measuring unit 60 to measure the amount of interference which occurs at the wireless resources for uplink use to thereby detect that the amount of interference at the uplink is not in the allowable range. On the other hand, if the radio wave from the mobile station 3b to the base station 2a is small, the base station 2a does not detect interference at the uplink.

As a result, the base station 2b changes the wireless resource allocation at the uplink. If the wireless resource allocation becomes the state 151, the overlap between the partial resources 341 allocated to the mobile station 3a2 and the partial resources 322 allocated to the mobile station 3b is eliminated, so the interference at the uplink signal is eliminated.

The base station 2 may determine the allocation pattern for the wireless resources of the uplink in the same way as the allocation pattern of the wireless resources of the downlink which was explained with reference to FIG. 8A and FIG. 8B and FIG. 9A to FIG. 9C. Further, in the same way as the allocation patterns of the downlink, the base station 2 may determine the order of the allocation patterns of the uplink in advance. When searching for the wireless resource allocations of the uplink, the resource control unit 56 successively selects a pattern from the plurality of allocation patterns in accordance with the order of the allocation patterns for use of wireless resource allocation and thereby switch wireless resource allocation.

Figure 13:
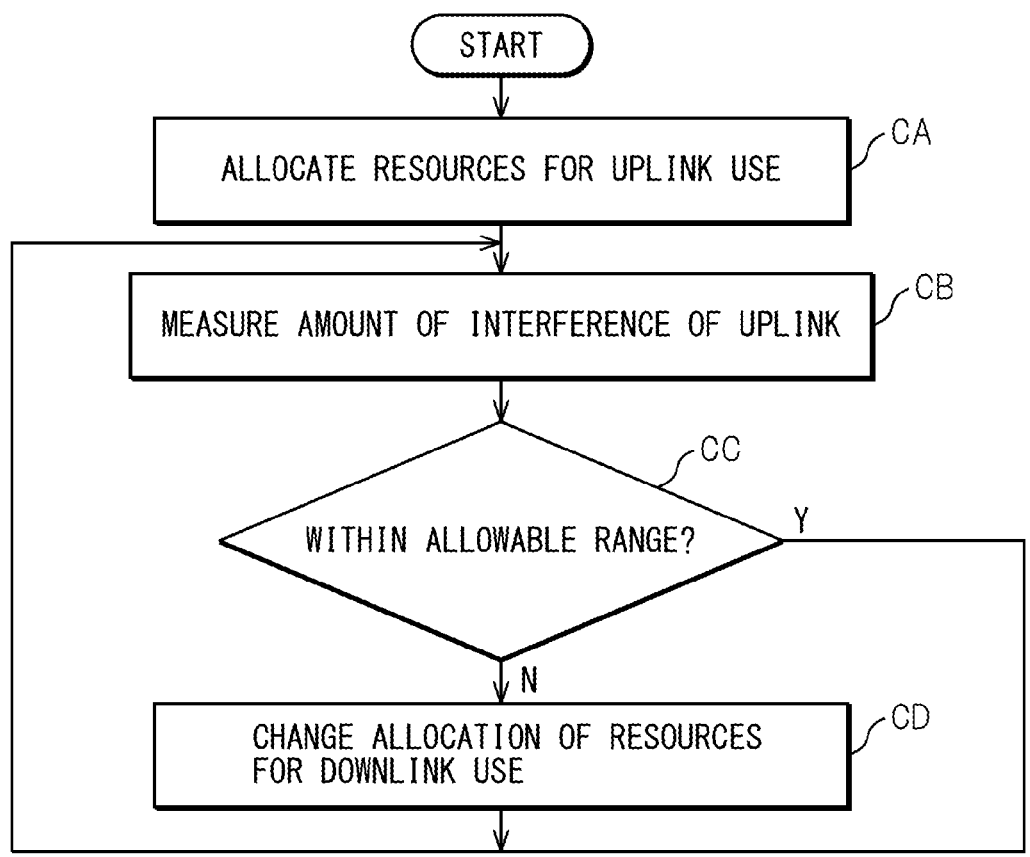
FIG. 13 is an explanatory view of wireless resource allocation processing at an uplink.

Next, referring to FIG. 13, the allocation of the wireless resources at the uplink by base station 2 will be explained. Note that, in another embodiment, the following operations CA to CD may also be steps.

In the operation CA, the resource control unit 56 of the base station 2 allocates wireless resources for communication of the uplink, between the mobile station 3 and the base station 2, to only a mobile station 3 for which connection is permitted by the authenticating unit 55. In the operation CB, the interference measuring unit 60 measures the amount of interference which occurs in the wireless resources for uplink use allocated to the mobile station 3.

In the operation CC, the interference judging unit 57 judges if the measured value is in the allowable range. If the measured value is in the allowable range (operation CC: Y), the processing returns to the operation CB. If the measured value is not in the allowable range (operation CC: N), the processing proceeds to the operation CD. In the operation CD, the resource control unit 56 changes the wireless resource allocation at the uplink.

After that, the processing returns to the operation CB. The change of the wireless resource allocation, in the operations CB to CD, is repeated until the amount of interference, occurred at the wireless resources of the uplink allocated to the mobile station 3, falls in the allowable range.

Figure 14:
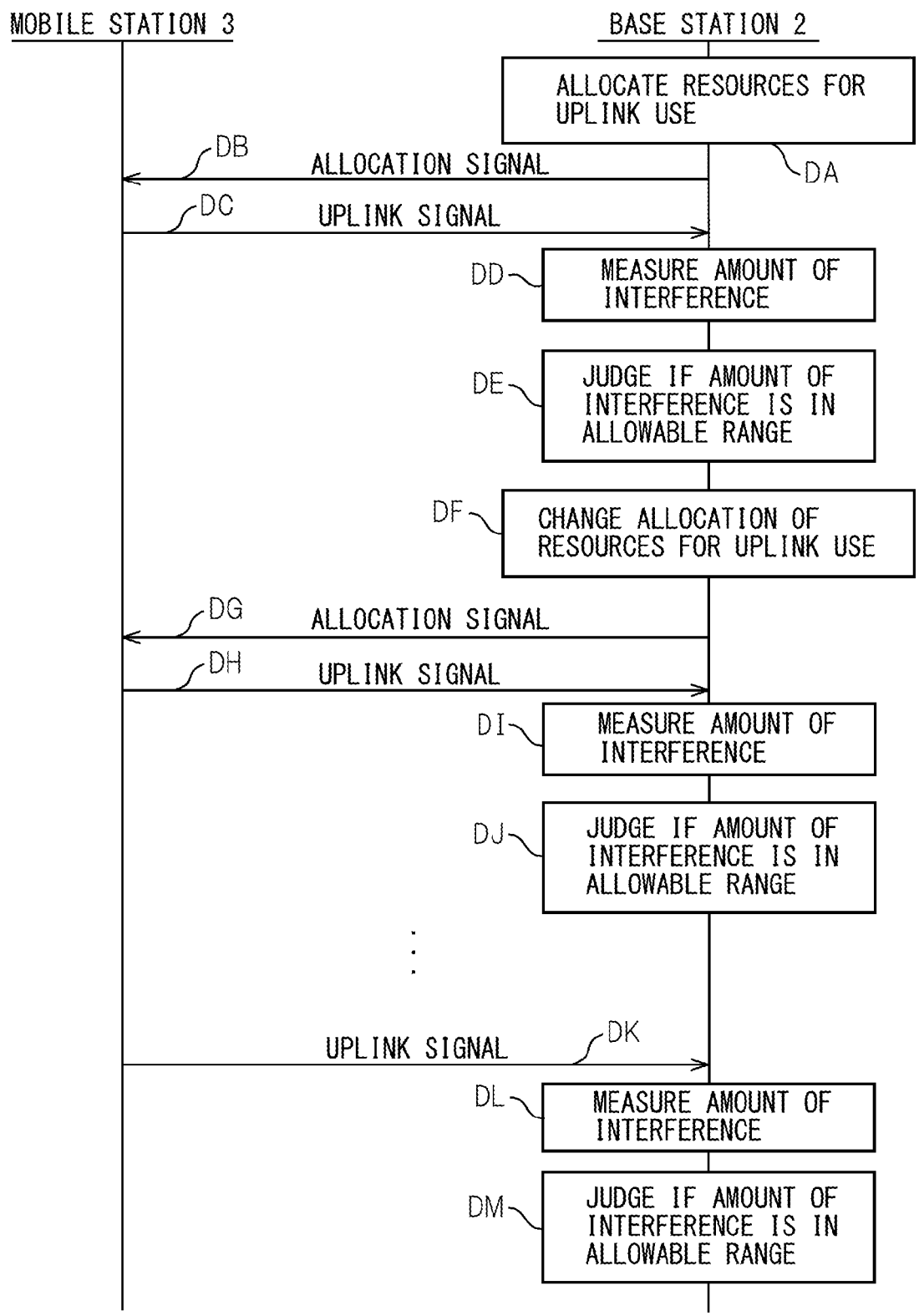
FIG. 14 is a signal sequence chart in the processing of FIG. 13.

Referring to FIG. 14, the sequence of signals which are transmitted between the base station 2 and the mobile station 3 in the processing of FIG. 13 will be explained. Note that, in another embodiment, the following operations DA to DN may also be steps.

In the operation DA, the resource control unit 56 of the base station 2 allocates wireless resources for communication of the uplink between the mobile station 3 and the base station 2. In the operation DB, the baseband processing unit 52 transmits the allocation signal to the mobile station 3. In the operation DC, the signal processing unit 22 of the mobile station 3 generates an uplink signal and transmits it to the base station 2.

In the operation DD, the interference measuring unit 60 of the base station 2 measures the amount of interference which is suffered by the uplink signal received in the operation DC. In the operation DE, the interference judging unit 57 judges if the measured value is in the allowable range. If the measured value is not in the allowable range, in the operation DF, the resource control unit 56 changes the wireless resource allocation at the uplink.

In the operation DG, the baseband processing unit 52 of the base station 2 transmits an allocation signal which notifies the wireless resources after change of allocation to the mobile station 3. In the operation DH, the signal processing unit 22 of the mobile station 3 transmits the uplink signal to the base station 2.

In the operation DI, the interference measuring unit 60 of the base station 2 measures the amount of interference which is suffered by the uplink signal received in the operation DH. In the operation DJ, the interference judging unit 57 judges if the measured value is in the allowable range. After that, processing similar to the operations DF to DJ is repeated to change the wireless resource allocation of the uplink repeatedly until the measured value falls in the allowable range.

In the operation DL, the interference measuring unit 60 of the base station 2 measures the amount of interference which is suffered by the uplink signal received in the operation DK. In the operation DM, the interference judging unit 57 judges that the measured value is in the allowable range, whereby the wireless resource allocation finishes being changed.

According to the present embodiment, even if the location of the antenna of the base station 2 changes or positions of the cells change, it is possible to determine a wireless resource allocation which can reduce the inter-cell interference. Therefore, according to the present embodiment, even in a situation where the location of the antenna of the base station 2 is not fixed or positions of the cells are not fixed, it is possible to determine a wireless resource allocation which can reduce the inter-cell interference. On the other hand, even in a system where the location of the antenna of the base station 2 is fixed or positions of the cells are fixed, it is clear that it is similarly possible to utilize the present embodiment.

Note that, the smaller number of mobile stations 3 which are susceptible to inter-cell interference, the easier it is to find a wireless resource allocation which can reduce the inter-cell interference. According to the present embodiment, only a mobile station 3 which has been registered in advance is permitted to connect to the base station 2. For this reason, the number of mobile stations 3 connected is limited, and therefore, the number of mobile stations 3, connecting, from the cell edge, where inter-cell interference easily occurs, to the base station 2 is reduced. As a result, it becomes easy to find a wireless resource allocation which can reduce the inter-cell interference and thus the processing time for a search may be reduced.

In particular, when the base station 2 is installed in a user's home or an office of a user, it can be avoided to connect to the base station 2 by unexpected third party from outside the home or outside the office, and thereby, the processing for allocation of wireless resources can be prevented from taking a long time.

Note that, when comparing the wireless resource allocation of FIG. 6 and the wireless resource allocation of FIG. 7, in the case of FIG. 6, a partial resource, which does not interfere with the downlink signal transmitted from the base station 2b, is the single resource 222 only. As opposed to this, in the case of FIG. 7, the two partial resources 243 and 244 do not interfere with the downlink signal of the base station 2b. Therefore, even when the mobile station 3a1 moves inside the cell 5b, in the case of FIG. 7, a wireless resource allocation where no inter-cell interference occurs can be found, while in the case of FIG. 6, there is no wireless resource allocation where no inter-cell interference occurs.

Therefore, by securing unused resources, the possibility of finding a wireless resource allocation where no inter-cell interference occurs can be enhanced. That is, by increasing the number of divisions of the wireless resources 200 more than the number of mobile stations being connected to the base station, it is possible to enhance the possibility of finding a wireless resource allocation where no inter-cell interference occurs.

For this reason, in one embodiment, the resource control unit 56 may increase the range of unused resources in the wireless resources at the downlink, when the amount of interference exceeds the allowable range in the wireless resources of the downlink allocated to the mobile station 3. That is, it is also possible to increase the number of divisions when dividing the wireless resources into partial resources. The same is true for the wireless resources of the uplink.

By the increase in the range of unused resources, it becomes easy to find a wireless resource allocation by which inter-cell interference is reduced. Alternatively, by the number of partial resources increasing, it becomes easier to find a wireless resource allocation which may reduce the inter-cell interference. As a result, the processing time for searching for a wireless resource allocation is reduced.

FIG. 15A to FIG. 15D are explanatory views of examples where the unused resources are increased. Increase of the range of unused resources includes change from the state where the unused resources are not secured to the state where the unused resources are secured. In FIG. 15A, the total resources 300 are allocated to the mobile station 3b. In FIG. 15B, the partial resources 322 are allocated to the mobile station 3b, while the partial resources 321 become unused resources. Increase of the range of unused resources includes change from the state of FIG. 15A to the state of FIG. 15B in this way.

Increase of the range of unused resources includes increase of the size of the range of unused resources from the state where unused resources have already been secured. In FIG. 15C, the partial resources 321 are allocated to the mobile station 3b, while the partial resources 322 becomes unused resources. The size of the unused resources is ½ of the total resources 300. In FIG. 15D, the partial resources 341 are allocated to the mobile station 3b, while the remaining partial resources 342 to 344 become unused resources. The size of the unused resources is ¾ of the total resources 300. The increase in the range of unused resources includes a change from the state of FIG. 15C to the state of FIG. 15D.

Further, when a certain base station 2 learns of the occurrence of interference at the downlink, even if this base station 2 increases the unused resources at the uplink, sometimes it becomes easy to find a wireless resource allocation which reduces the interference. The same is true if a certain base station 2 learns of interference at the uplink and this base station 2 increases the unused resources at the downlink.

For example, as shown in FIG. 16, assume the case where the mobile station 3a2 is located in the cell 5b of the base station 2b. At this time, if the wireless resources of the downlink allocated to the mobile station 3a2 overlap the wireless resources which the base station 2b allocated to the mobile station 3b, the reception signal of the mobile station 3a2 suffers from interference. At this time, the mobile station 3a2 notifies the base station 2a of the occurrence of interference at the downlink, but the base station 2b is not notified.

Now, assume the wireless resource allocation at the downlinks by the base station 2a and base station 2b is as in the state which is illustrated by reference numeral 104. The base station 2a divides the wireless resources 200 of the downlink into four partial resources 241 to 244. Further, the base station 2b divides the wireless resources 200 into two partial resources 221 to 222, allocates the partial resources 222 to the mobile station 3b, and designates the partial resources 221 as unused resources. For this reason, the options for selecting the partial resources, which the base station 2a can allocate to the mobile station 3a2, are the partial resources 241 and 242, unless the base station 2b increases the unused resources.

When the mobile station 3a2 is positioned inside the cell 5b of the base station 2b, sometimes the transmission signal from the mobile station 3a2 interferes with the reception signal of the uplink which the base station 2b receives. Therefore, when the base station 2b detects interference at the wireless resources of the uplink, it is possible to judge that there is a possibility of interference occurring in the wireless resources of the downlink as well. In the example of FIG. 16, when the base station 2b detects interference at the wireless resources of the uplink, the unused region of the wireless resources at the downlink is increased as with the wireless resource allocation indicated by reference numeral 105. The base station 2b divides the wireless resources 200 of the downlink into four partial resources 241 to 244 and allocates the partial resources 244 to the mobile station 3b.

As a result, the options for selecting the partial resources which the base station 2a can allocate to the mobile station 3a2 increase to the three of the partial resources 241 to 243. As a result, at the base station 2a, it becomes easy to find a wireless resource allocation not causing inter-cell interference at the downlink.

For this reason, in one embodiment, when the interference judging unit 57 judges that the amount of interference at the downlink is not in the allowable range, the resource control unit 56 increases the amount of unused resources of the wireless resources at the uplink. That is, the resource control unit 56 increases the number of divisions to partial resources to be divided. Further, when the interference judging unit 57 judges that the amount of interference at the uplink is not in the allowable range, the resource control unit 56 increases the amount of unused resources of the wireless resources at the downlink.

3. Second Embodiment

Next, another embodiment will be explained. As explained above, if increasing the amount of unused resources, it becomes easy to reduce the inter-cell interference. On the other hand, the wireless resources which are available for communications are decreased, whereby the communication speed falls. Which of avoidance of inter-cell interference and communication speed should be given priority and at what extent, differs depending on the user or the situation. In this regard, in the present embodiment, whether to secure unused resources is designated by the user. In place of or in addition to this, in the present embodiment, the amount of unused resources is designated by the user.

Figure 17:
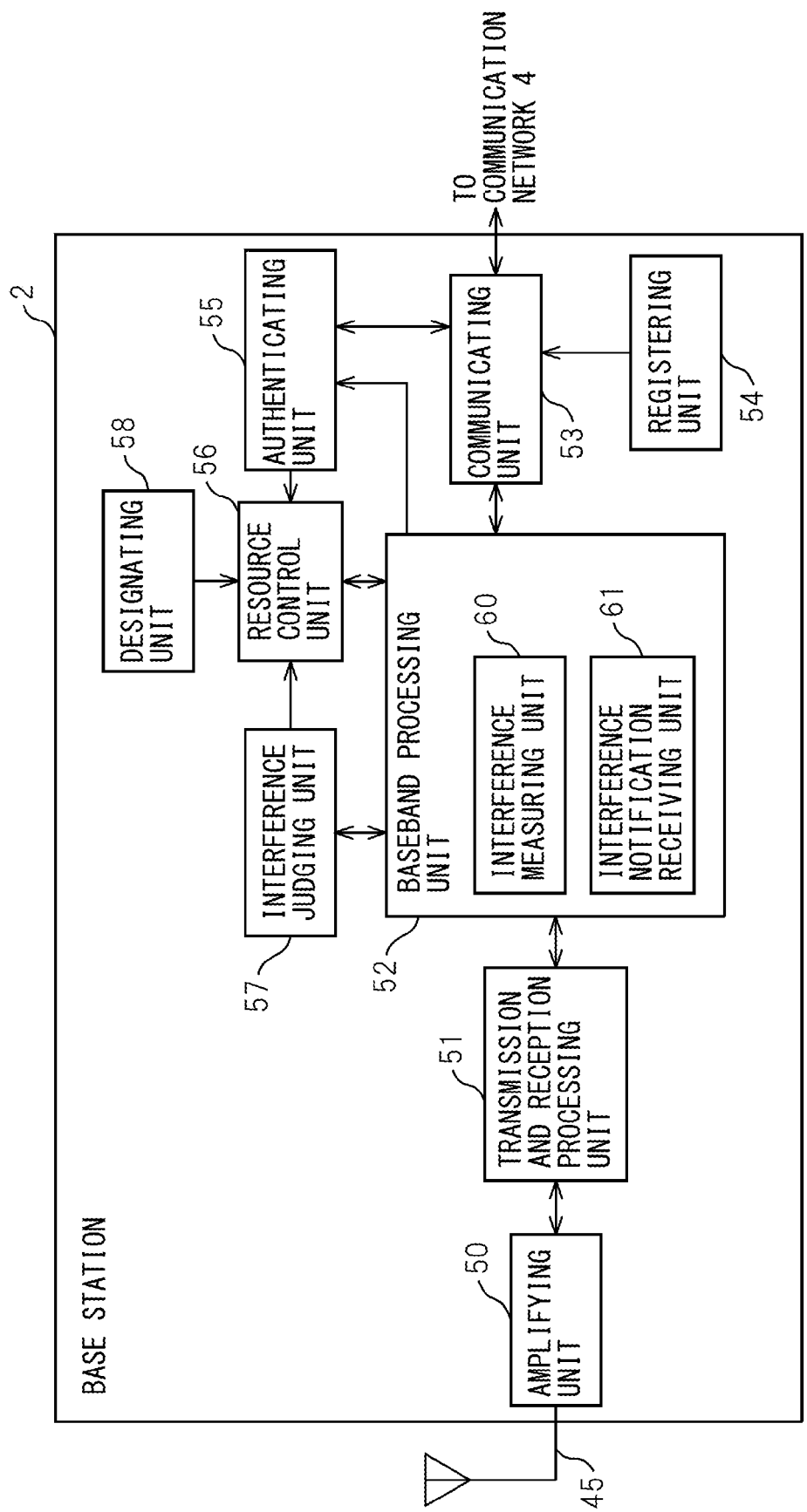
FIG. 17 is a view of the configuration of a second example of a base station.

FIG. 17 is a view of the configuration of a second example of the base station 2. Component elements the same as the component elements which are illustrated in FIG. 5 are assigned the same reference numerals. The operations of the component elements to which the same reference numerals are assigned are the same unless particularly explained. Further, the component elements and functions which are illustrated in FIG. 17 may also be provided in other embodiments.

The base station 2 is provided with a designating unit 58. The designating unit 58 receives input of a designation from the user through the input unit 43. The input designation designates as to securing unused resources and/or designating the amount of unused resources. The resource control unit 56 determines, at the time of allocation of the wireless resources, whether to secure unused resources in accordance with the designation by the designating unit 58. In place of or in addition to this, the resource control unit 56 determines the amount of unused resources in accordance with the designation by the designating unit 58 at the time of allocation of the wireless resources.

FIG. 18A and FIG. 18B are explanatory views of examples of the settings which are designated by the designating unit 58. In the example of settings which is indicated in FIG. 18A, the user can designate whether to secure unused resources. When securing unused resources, the user inputs the setting "ON". When prohibiting securing unused resources, the user inputs the setting "OFF".

In the example of the settings indicated in FIG. 18A, the user can designate the amount of unused resources. When securing ½, ¼, ⅛, ... $1/(2^n)$ of all resources as unused resources, the user inputs the settings "1", "2", "3", ... "n".

In the present embodiment, the user can itself designate which of avoidance of inter-cell interference and communication speed should be given priority and at what extent. For this reason, according to the present embodiment, it is possible to prevent the base station 2 from operating in a state which is not suited to the mode of use desired by the user. For example, the situation may be avoided where, even though a low communication speed being enough, since the unused resources are insufficient, connection between the base station 2 and mobile station 3 cannot be established. Further, the situation can be avoided where the unused resources are excessive, so the communication speed unnecessarily falls.

4. Third Embodiment

Figure 19:
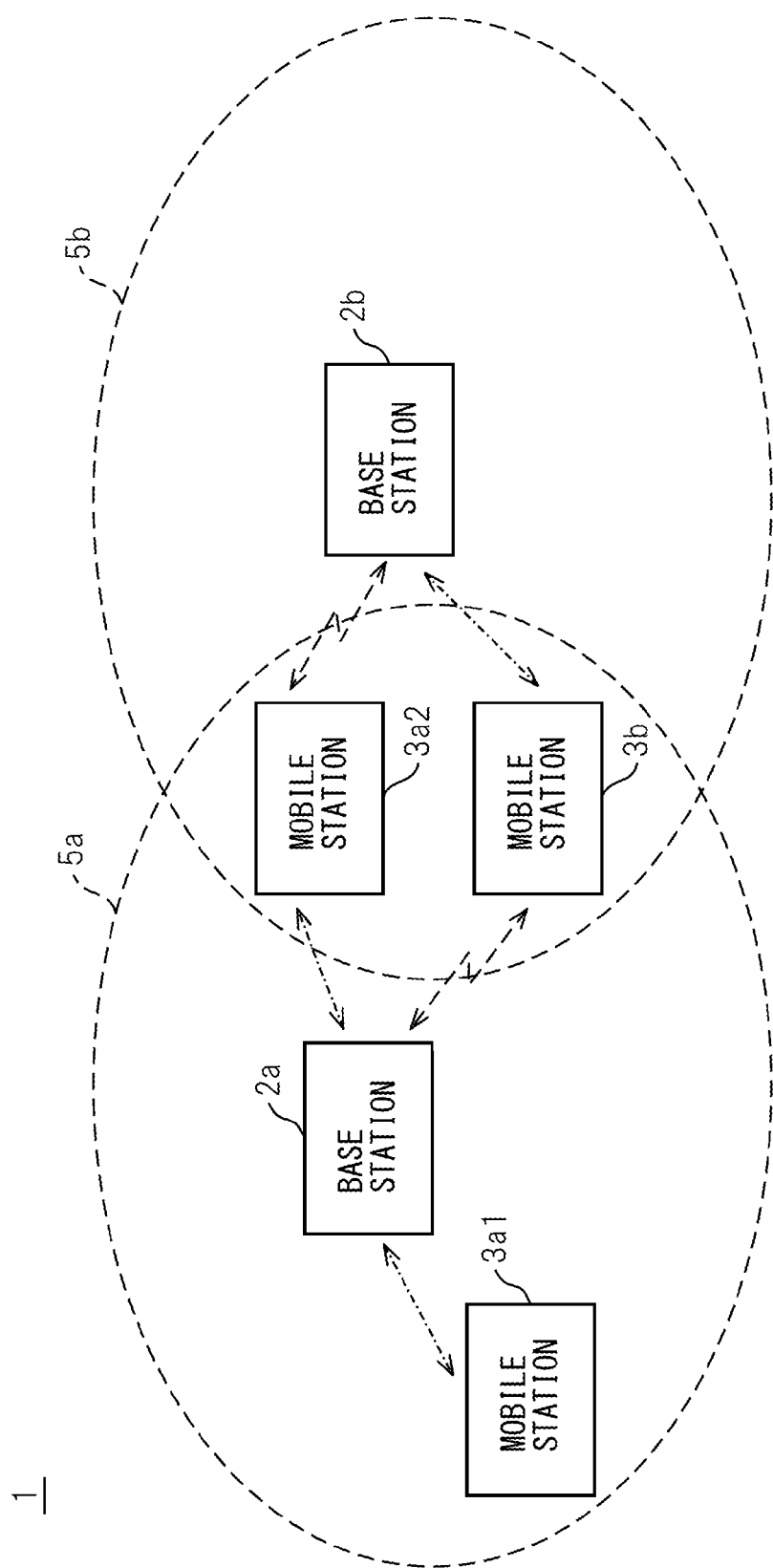
FIG. 19 is an explanatory view of the state where a base station of a peripheral cell carries out processing for searching for a wireless resource allocation simultaneously.

Next, another embodiment will be explained. Sometimes base stations 2 of peripheral cells simultaneously run processing for searching for a wireless resource allocation. FIG. 19 is an explanatory view of the state where the base stations 2*a* and 2*a* simultaneously run processing for searching for a wireless resource allocation.

In an example of FIG. 19, the mobile station 3*a*2 which is connected to the base station 2*a* is positioned inside the cell 5*b* of the base station 2*b*. If the base station 2 uses the same resources as the wireless resources for downlink use allocated to the mobile station 3*a*2, the mobile station 3*a*2 suffers from interference by the transmission signal of the base station 2*b*. Further, the mobile station 3*b* connected to the base station 2*b* is positioned inside the cell 5*a* of the base station 2*a*. If the base station 2*a* uses the same resources as the wireless resources for downlink use which are allocated to the mobile station 3*b*, the mobile station 3*b* suffers from interference by the transmission signal of the base station 2*a*. In this case, the base stations 2*a* and 2*b* perform processing for searching for a wireless resource allocation of the downlink at the same time.

Further, if the wireless resources for uplink use allocated to the mobile station 3*a*2 and the wireless resources for uplink use allocated to the mobile station 3*b* overlap, the signal which the base station 2*b* receives suffers from interference. If the wireless resources for uplink use allocated to the mobile station 3*b* and the wireless resources for uplink use allocated to the mobile station 3*a*1 or 3*a*2 overlap, the signal which the base station 2*a* receives suffers from interference. In this case, the base stations 2*a* and 2*b* perform processing for searching for a wireless resource allocation of the uplink at the same time.

Assume that, when the base stations 2*a* and 2*b* of the peripheral cells simultaneously perform processing for searching for a wireless resource allocation in this way, the allocation changing timings, where the wireless resource allocations change, are not synchronized between the base stations 2*a* and 2*b*.

Figure 20:
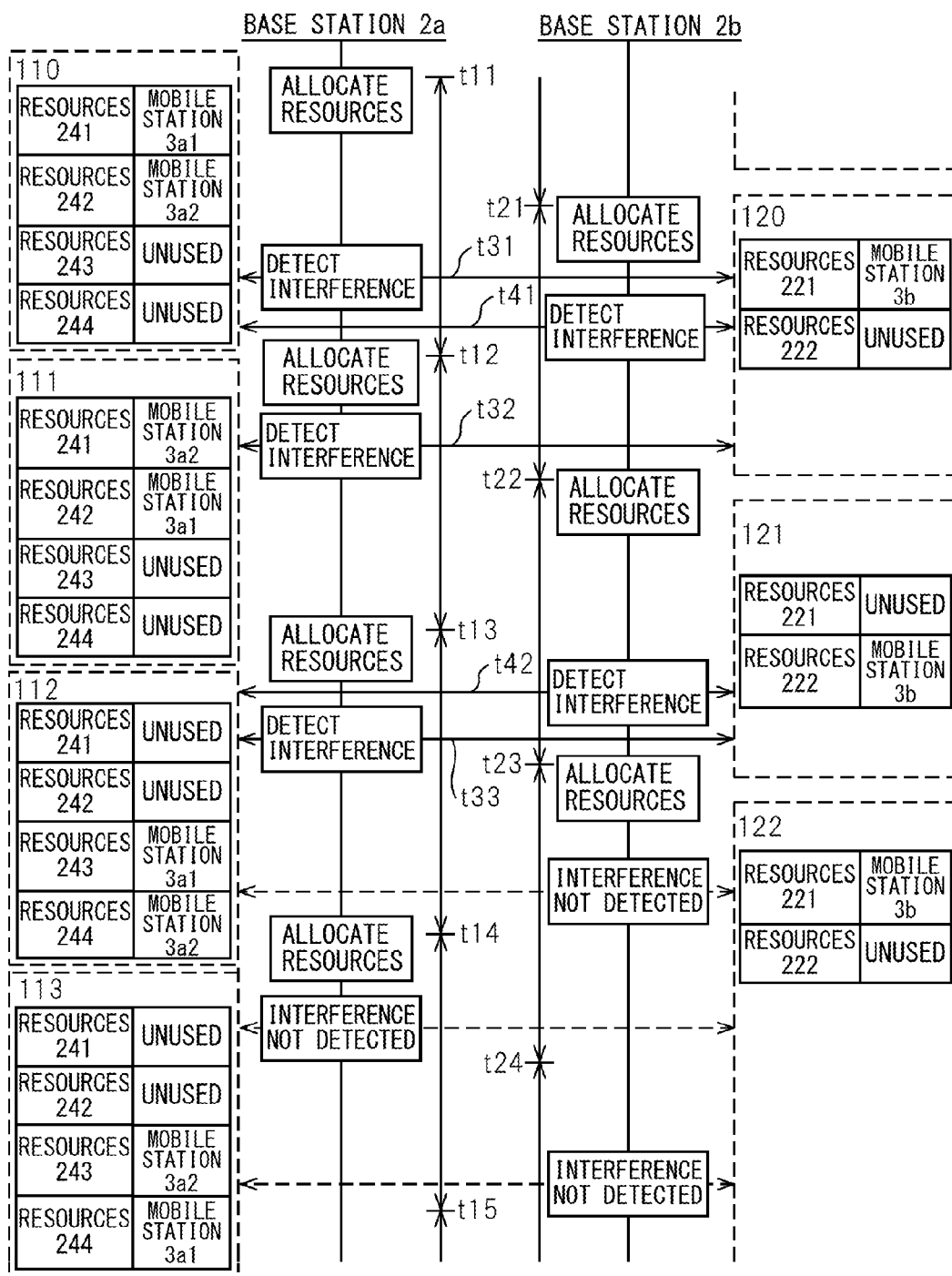
FIG. 20 is an explanatory view of the state where the allocation changing timings of wireless resources are not synchronized among base stations.

FIG. 20 is an explanatory view of the state where the allocation changing timings of the wireless resources are not synchronized between the base stations 2*a* and 2*b*. Note that, in the example of FIG. 20, the example of wireless resources at the downlink is shown, but the same applies in the case of the uplink as well.

The base stations 2*a* and 2*b* change the allocations of wireless resources at the allocation changing timings of the wireless resources which arrive periodically at the base stations. In the example of FIG. 20, the allocation changing timing at the base station 2*a* arrives at the times t11, t12, t13, t14, t15 . . . . The allocation changing timing at the base station 2*b* arrives at the times t21, t22, t23, t24 . . . .

Here, the time period between two consecutive allocation changing timings will be referred to as a "change cycle". The base station 2*a* detects the presence of any interference which occurs at the wireless resources allocated to the downlink at the change cycles t11 to t12, t12 to t13, t13 to t14, t14 to t15 . . . . If interference which exceeds the allowable range is detected at any of the change cycles, the base station 2*a* changes the wireless resource allocation at the allocation changing timing right after this change cycle.

In the example of FIG. 20, the wireless resource allocation is changed at the allocation changing timings t11 to t14. Reference numerals 110 to 113 indicate wireless resource allocations which are allocated at the allocation changing timings t11 to t14. Note that, the procedure for allocation of the wireless resource allocations 110 to 113 is obtained by selecting the patterns 3 to 6 in the ascending order of the pattern number, while deeming the mobile stations 3*a*1 and 3*a*2 as the mobile stations A and B of the allocation pattern of FIG. 8B.

The base station 2*b* detects the presence of any interference which occurs at the wireless resources allocated to the downlink, at the change cycles t21 to t22, t22 to t23, t23 to t24 . . . . If interference exceeding the allowable range is detected at any of the change cycles, the base station 2*b* changes the wireless resource allocation at the allocation changing timing right after this change cycle.

In this example, the base station 2*b* changes the wireless resource allocation at the allocation changing timings t21 to t23. Reference numerals 120 to 122 illustrate wireless allocations which are allocated at the allocation changing timings t21 to t23. Note that, the procedure for allocation of the wireless resource allocations 120 to 122 is obtained by alternately selecting the patterns 1 and 2, while deeming the mobile station 3*b* as the mobile station A of the allocation pattern of FIG. 9B.

At the timing t31 in the change cycles t11 to t12, the resources 242 allocated to the mobile station 3*a*2 and the resources 221 allocated to the mobile station 3*b* overlap. For this reason, the base station 2*a* changes the wireless resource allocation at the next allocation changing timing t12. At the timing t32 in the change cycles t12 to t13, the resources 241 allocated to the mobile station 3*a*2 and the resources 221 allocated to the mobile station 3*b* overlap. For this reason, the base station 2*a* changes the wireless resource allocation at the next allocation changing timing t13.

At the timing t33 in the change cycles t13 to t14, the resources 244 allocated to the mobile station 3*a*2 and the resources 244 allocated to the mobile station 3*b* overlap. For this reason, the base station 2*a* changes the wireless resource allocation at the next allocation changing timing t14. At the change cycles t14 to t15, there is no overlap between the resources 243 allocated to the mobile station 3*a*2 and the resources 221 allocated to the mobile station 3*b*. Therefore, the base station 2*a* does not change the wireless resource allocation.

On the other hand, at the timing t41 in the change cycles t21 to t22, the resources 241 allocated to the mobile station 3*a*2 and the resources 221 allocated to the mobile station 3*b* overlap. For this reason, the base station 2*b* changes the wireless resource allocation at the next allocation changing timing t22. At the timing t42 in the change cycles t22 to t23, the resources 244 allocated to the mobile station 3*a*2 and the resources 222 allocated to the mobile station 3*b* overlap. For this reason, the base station 2*b* changes the wireless resource allocation at the next allocation changing timing t23.

In the change cycles t23 to t24, there is no overlap between the resources 244 allocated to the mobile station 3*a*2 and the resources 221 allocated to the mobile station 3*b*. For this reason, the base station 2*b* does not change the wireless resource allocation. In this way, the processing for searching for the wireless resource allocation of the base stations 2*a* and 2*b* is ended.

As indicated in FIG. 20, in the middle of the first change cycle at the base station 2*a*, the base station 2*b* changes the wireless resource allocation. For this reason, it is judged, in one change cycle, if interference has occurred between two wireless resource allocations to the base station 2*b*, at each of the wireless resource allocations 110 to 112 to the base station 2*a*. For example, it is judged, for the wireless resource allocation 111 to the base station 2*a*, if interference occurs between the wireless resource allocations 120 and 121 to the base station 2*b*. Further, it is judged, for the wireless resource allocation 112 to the base station 2*a*, if interference occurs between the wireless resource allocations 121 and 122 to the base station 2b. It is judged, in one change cycle, if interference occurs between two wireless resource allocations to the base station 2a for the wireless resource allocations 120 to 122 to the base station 2b.

If the allocation changing timings are synchronized between the base stations 2a and 2b, it is judged, in one change cycle, if interference has occurred between only the wireless resource allocation of a cell 5a and the wireless resource allocation of a cell 5b. For this reason, when the allocation changing timings are not synchronized between the base stations 2a and 2b, compared with when they are synchronized as above, the number of combinations of wireless resource allocation, which are compared between cells 5, increases and the opportunities for detection of interference increase. As a result, when the allocation changing timings are not synchronized, compared with when they are synchronized, the number of times of changing the wireless resource allocation increases and the processing for search for the wireless resource allocation may end late.

Therefore, the present embodiment synchronizes the allocation changing timing between base stations 2.

Figure 21:
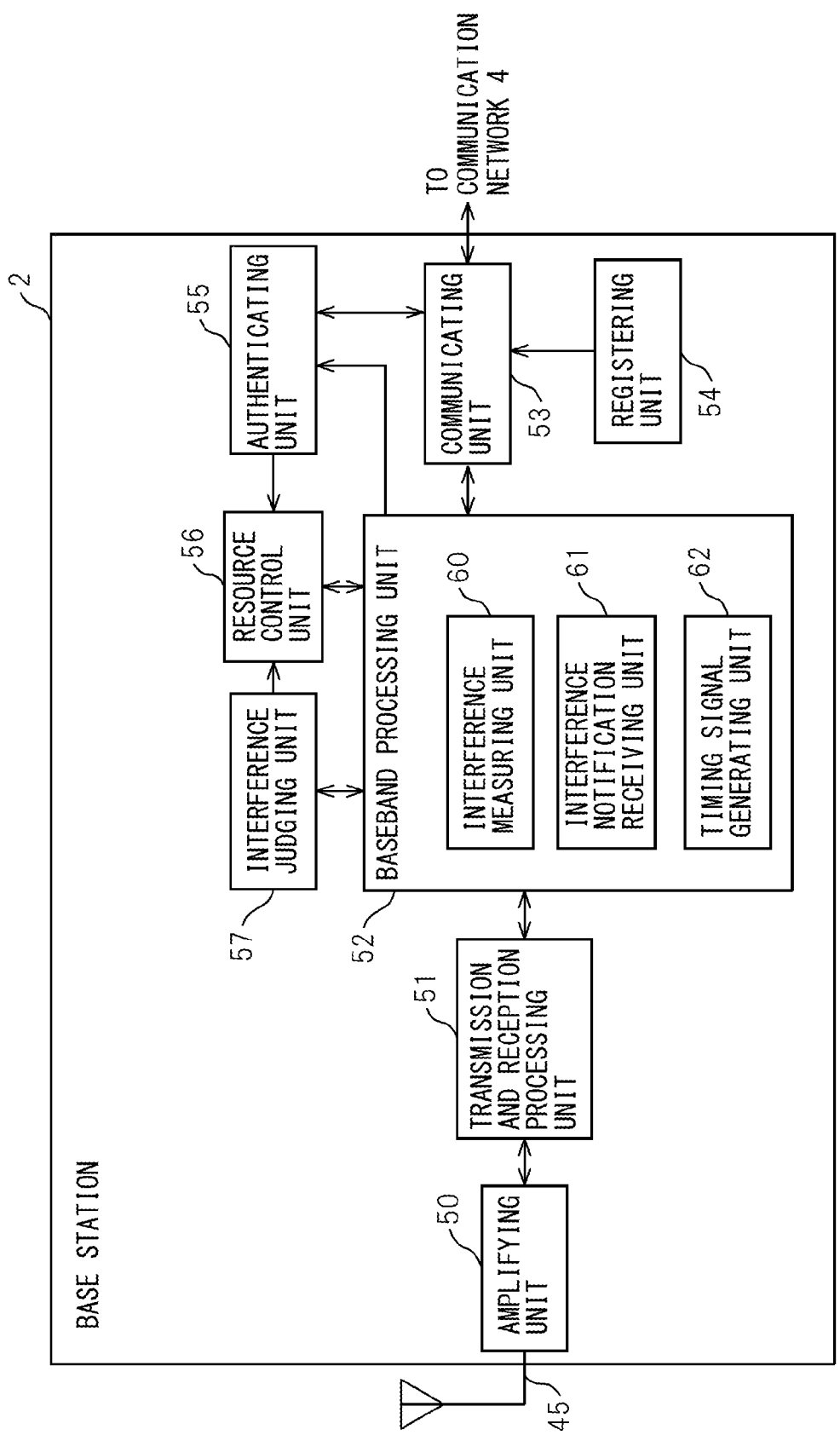
FIG. 21 is a view of the configuration of a third example of a base station.

FIG. 21 is a view of the configuration of a third example of a base station 2. Component elements the same as the component elements which are illustrated in FIG. 5 are assigned the same reference numerals. The operations of the component elements to which the same reference numerals are assigned are the same unless particularly explained. Further, the component elements and functions which are illustrated in FIG. 21 may also be provided in other embodiments.

The baseband processing unit 52 is provided with a timing signal generating unit 62. The timing signal generating unit 62 generates a periodic timing signal which is synchronized with the base station 2 of the peripheral cell. For example, the timing signal generating unit 62 may generate a frame timing signal for synchronization of the frame timings between cells belonging to different base stations.

In one embodiment, the timing signal generating unit 62 may use a GPS (global positioning satellite) signal as the basis to generate timing signals which are synchronized between the base stations. In another embodiment, the timing signal generating unit 62 may receive a signal which is transmitted from another base station to generate a timing signal which is synchronized with the other base station by air synchronization for synchronizing the base stations with each other. When the base station 2 is a small sized base station which forms a femtocell, the timing signal generating unit 62 may generate a timing signal which is synchronized with another base station by synchronizing with the other small-sized base station based on a synchronization signal which is transmitted from the base station of the macrocell. The resource control unit 56 changes the wireless resource in synchronization with the timing signal which is output from the timing signal generating unit 62.

Figure 22:
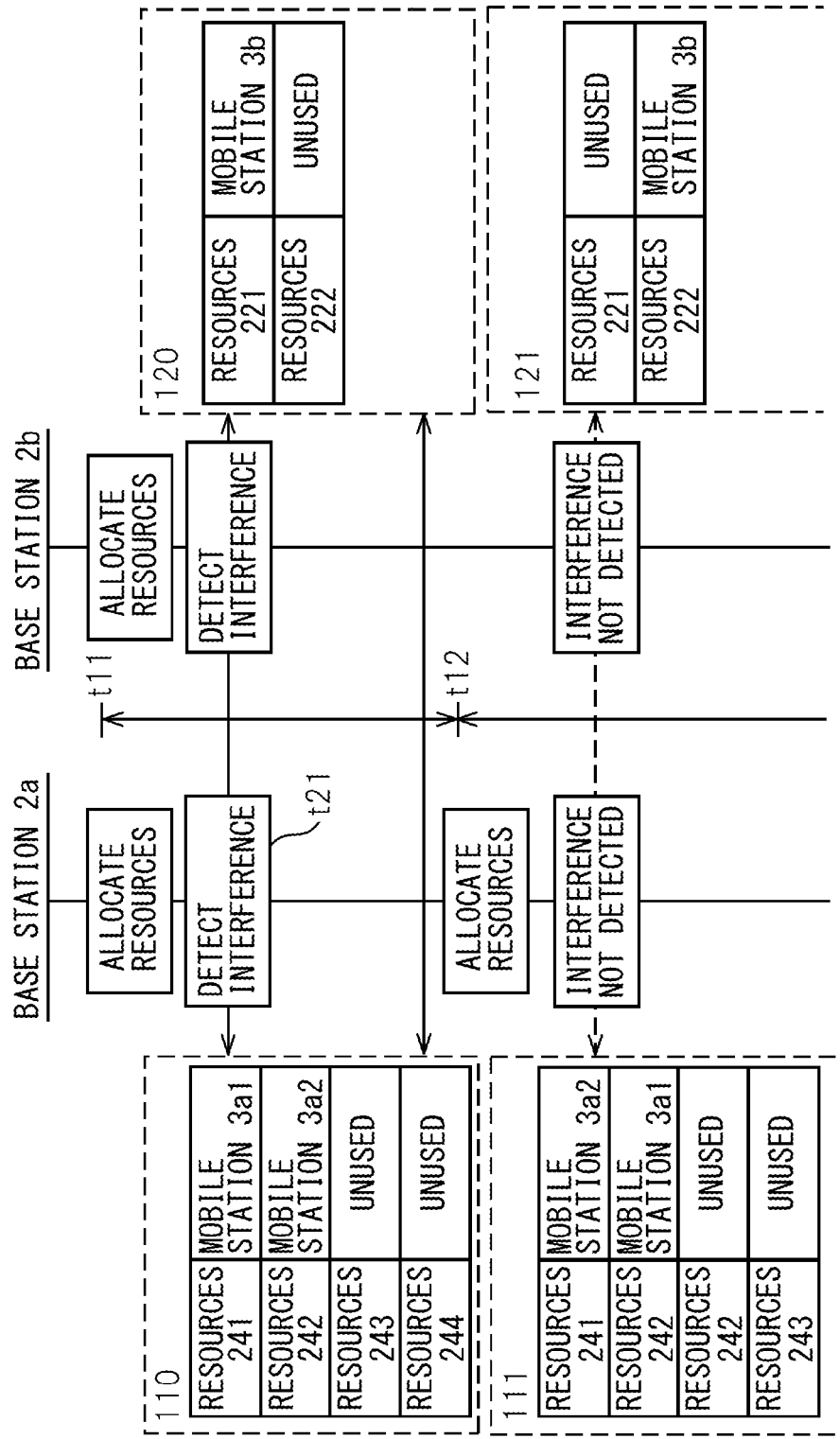
FIG. 22 is an explanatory view of the state where the allocation changing timings of wireless resources are synchronized among base stations.

FIG. 22 is an explanatory view of the state where the allocation changing timings of the wireless resource are synchronized. The base stations 2a and 2b change the wireless resource allocation at synchronized allocation changing timings t11, t12, . . . . For comparison, in the same way as the search processing of FIG. 20, the allocation patterns of FIG. 8B and FIG. 9B are used to prepare examples of wireless resource allocation.

At the timing t21 in the change cycles t11 to t12, the resource 242 allocated to the mobile station 3a2 and the resource 221 allocated to the mobile station 3b overlap. For this reason, the base stations 2a and 2b change the wireless resource allocations at the next allocation changing timing t12. At the change cycle after the timing t12 and on, the resource 242 allocated to the mobile station 3a2 and the resource 221 allocated to the mobile station 3b do not overlap. For this reason, the base stations 2a and 2b end the processing for searching for the wireless resource allocation.

If compared with the search processing of FIG. 20, in the case of FIG. 20, after the base station 2a changes the wireless resource allocation three times and the base station 2b changes the wireless resource allocation two times, the processing for searching for the wireless resource allocation is ended. In the case of FIG. 22, the base stations 2a and 2b just change the wireless resource allocation one time, the processing for searching for the wireless resource allocation is ended. In this way, according to the present embodiment, it becomes possible to end the processing for searching for the wireless resource allocation early.

5. Fourth Embodiment

Next, another embodiment will be explained. Having peripheral cells not use the same wireless resource simultaneously enables inter-cell interference to be easily avoided. Therefore, the resource control unit 56 of the base station 2 of the present embodiment randomly determines the wireless resource allocation.

Figure 23:
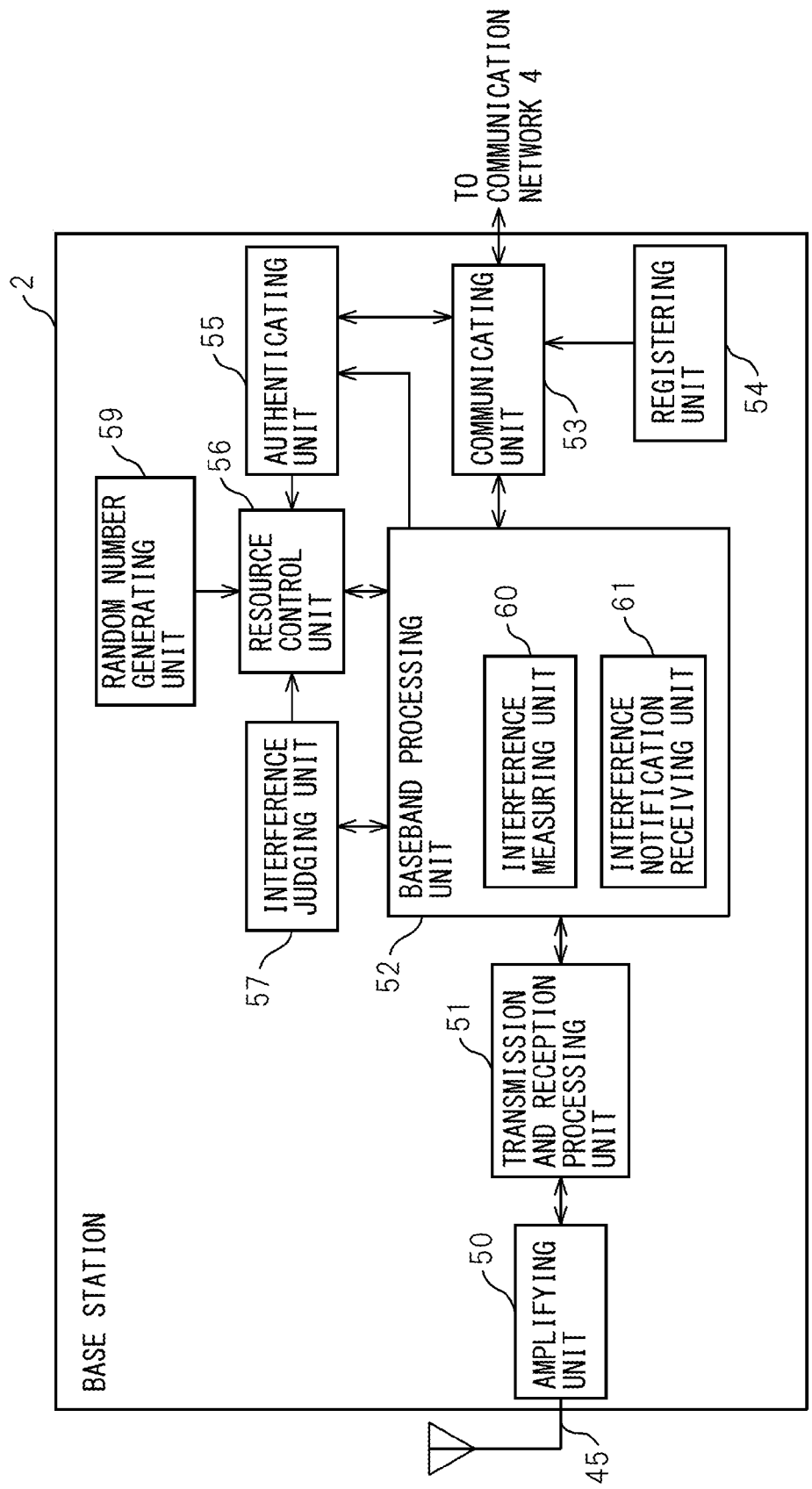
FIG. 23 is a view of the configuration of a fourth example of a base station.

FIG. 23 is a view of the configuration of a fourth example of the base station 2. Component elements the same as the component elements which are illustrated in FIG. 5 are assigned the same reference numerals. The operations of the component elements to which the same reference numerals are assigned are the same unless particularly explained. Further, the component elements and functions which are illustrated in FIG. 23 may also be provided in other embodiments.

The base station 2 is provided with a random number generating unit 59 which successively generates random numbers. The resource control unit 56 stores a plurality of allocation patterns of the wireless resources and pattern numbers which uniquely identify the individual patterns. For example, the resource control unit 56 may store a plurality of allocation patterns of the wireless resources and pattern numbers as illustrated in FIGS. 8A and 8B and FIG. 9A to FIG. 9C.

The resource controlling unit 56 selects an allocation pattern of a pattern number which corresponds to the random number which is generated by the random number generating unit 59 as the wireless resource allocation to be switched to, when switching the wireless resource allocation.

According to the present embodiment, in the processing for searching for the wireless resource allocation, the procedure for switching wireless resource allocations is randomly determined, so peripheral cells can reduce the probability of use of the same wireless resources simultaneously. As a result, a wireless resource allocation which reduces the inter-cell interference becomes difficult to find, so it becomes possible to shorten the processing time of the processing for searching for the wireless resource allocation.

6. Fifth Embodiment

Next, another embodiment will be explained. Depending on the relative positional relationship between the mobile station 3 and the base station 2 of the peripheral cell and the state of the wireless resource allocation by the base station of the peripheral cell, sometimes it is difficult to avoid interference being suffered by the mobile station 3. In such a case, the user is guided to a location where the mobile station 3 does not suffer from interference, so user friendliness is improved.

For this reason, in the present embodiment, the mobile station 3 outputs a predetermined alarm message when interference occurs.

Figure 24:
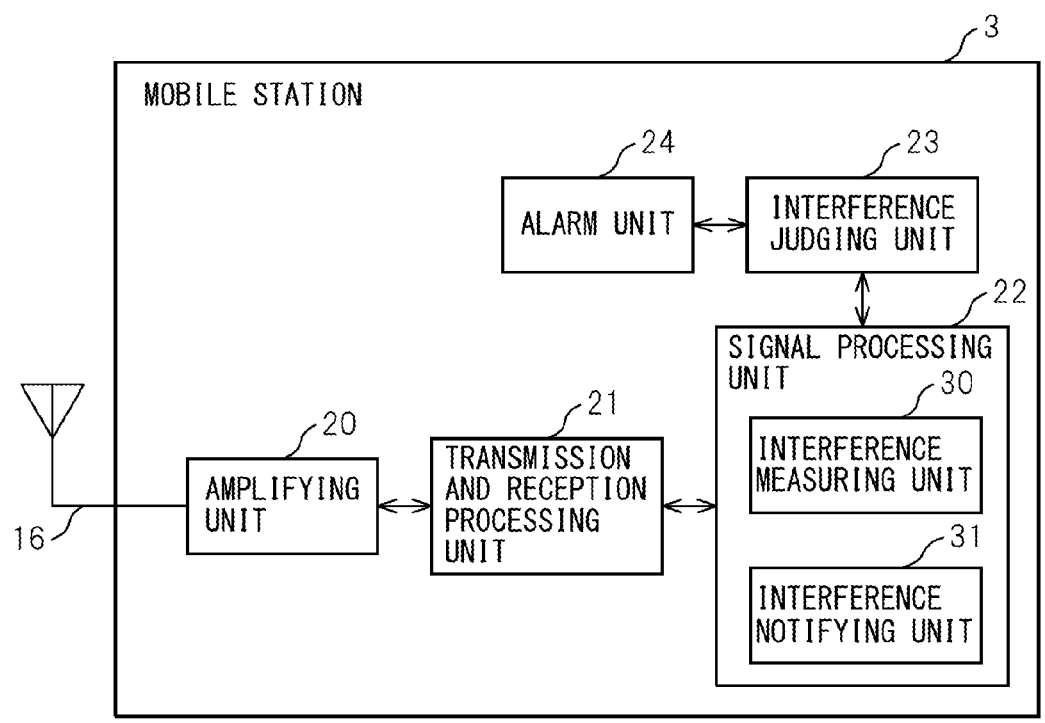
FIG. 24 is a view of the configuration of a second example of a mobile station.

FIG. 24 is a view of the configuration of a second example of a mobile station 3. Component elements the same as the component elements which are illustrated in FIG. 3 are assigned the same reference numerals. The operations of the component elements to which the same reference numerals are assigned are the same unless particularly explained. Further, the component elements and functions which are illustrated in FIG. 24 may also be provided in other embodiments.

The mobile station 3 is provided with an alarm unit 24 which outputs a predetermined alarm message through the output unit 14. The interference judging unit 23 starts counting the time by activating a time-counting timer, when the amount of interference which occurs at wireless resources, allocated from the base station 2 to the mobile station 3, exceeds the allowable range. In one embodiment, the interference judging unit 23 monitors the measured values of the interference measuring unit 30 to thereby judge if the amount of interference which occurs at the wireless resources of the downlink, allocated from the base station 2 to the mobile station 3, exceeds the allowable range.

In another embodiment, the base station 2 may also be configured to notify the mobile station 3 of the amount of interference which occurs at the wireless resources of the uplink. Alternatively, the base station 2 may be configured to transmit to the mobile station 3 an interference notification signal which notifies if the amount of interference, which occurs at the uplink, exceeds the allowable range. For example, the baseband processing unit 52 of the base station 2 may be provided with an interference notifying unit which transmits the amount of interference or an interference notification signal. The interference judging unit 23 receives the amount of interference or interference notification signal which is transmitted from the base station 2 to thereby judge if the amount of interference which occurs at the wireless resources of the uplink, allocated from the base station 2 to the mobile station 3, exceeds the allowable range.

The interference judging unit 23 makes the alarm unit 24 output a predetermined alarm message when the amount of interference exceeds the allowable range, even if the time-counting operation of the time-counting timer exceeds a predetermined time limit period. The alarm message, for example, may be a visual or audio message which prompts the user to move.

After an alarm message is output, the interference judging unit 23 judges if the amount of interference is kept in the allowable range. When the amount of interference is kept in the allowable range, the interference judging unit 23 makes the alarm unit 2 output a predetermined notification message. The notification message, for example, may be a visual or audio message which notifies the fact of communication becoming possible or the fact that movement may be stopped.

Figure 25A:
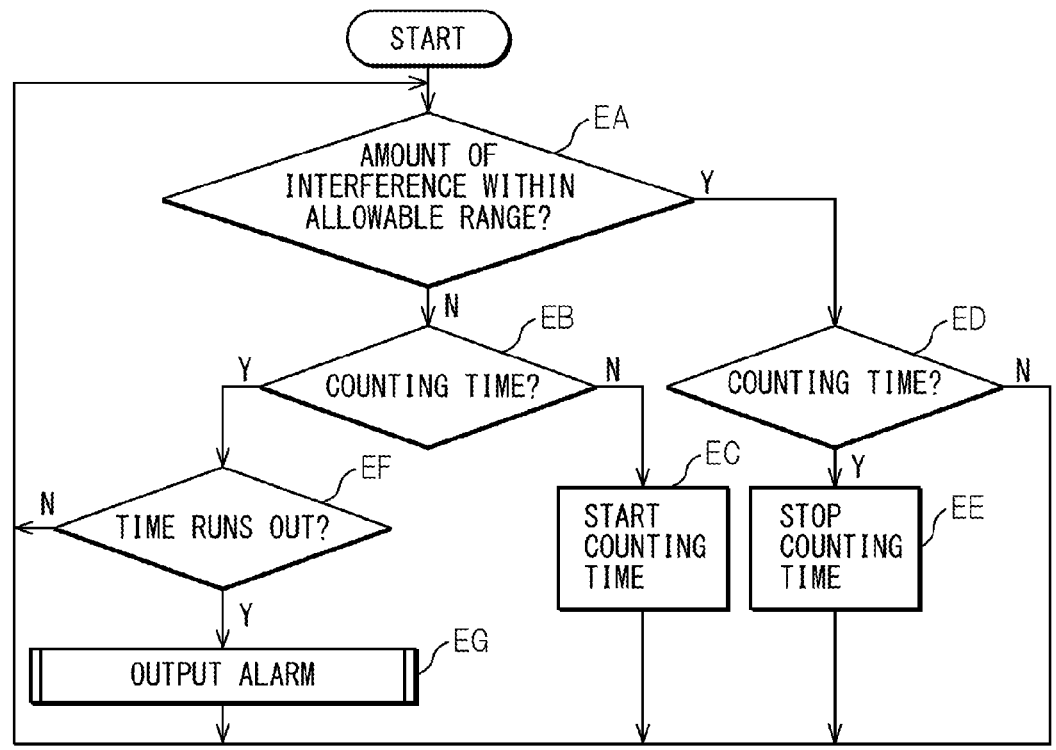
FIGS. 25A and 25B are explanatory views of alarm output processing by a mobile station.

FIG. 25A is an explanatory view of alarm output processing by the mobile station. Note that, in another embodiment, the following operations EA to EG may also be steps.

In the operation EA, the interference judging unit 23 judges if the amount of interference which occurs in wireless resources, which the base station 2 allocates to the mobile station 3, is in an allowable range. When the amount of interference is in the allowable range (operation EA: Y), the processing proceeds to the operation ED. When the amount of interference is not in the allowable range (operation EA: N), the processing proceeds to EB.

In the operation EB, the interference judging unit 23 judges if the time-counting timer is in the middle of counting time. When the time-counting timer is in the middle of counting time (operation EB: Y), the processing proceeds to the operation EF. When the time-counting timer is not in the middle of counting time (operation EB: N), the processing proceeds to the operation EC. In the operation EC, the interference judging unit 23 starts the time-counting operation by the time-counting timer.

In the operation ED, the interference judging unit 23 judges if the time-counting timer is in the middle of counting time. When the time-counting timer is in the middle of counting time (operation ED: Y), the processing proceeds to the operation EE. When the time-counting timer is not in the middle of counting time (operation EC: N), the processing returns to the operation EA. In the operation EE, the interference judging unit 23 stops the time-counting operation of the time-counting timer. After that, the processing returns to the operation EA.

In the operation EF, the interference judging unit 23 judges if the counted time of the time-counting timer exceeds a predetermined time limit period. When the counted time exceeds the time limit period (operation EF: Y), the processing proceeds to the operation EG. When the counted time does not exceed the time limit period (operation EF: N), the processing returns to the operation EA. After the operation EG, the processing returns to the operation EA.

Figure 25B:
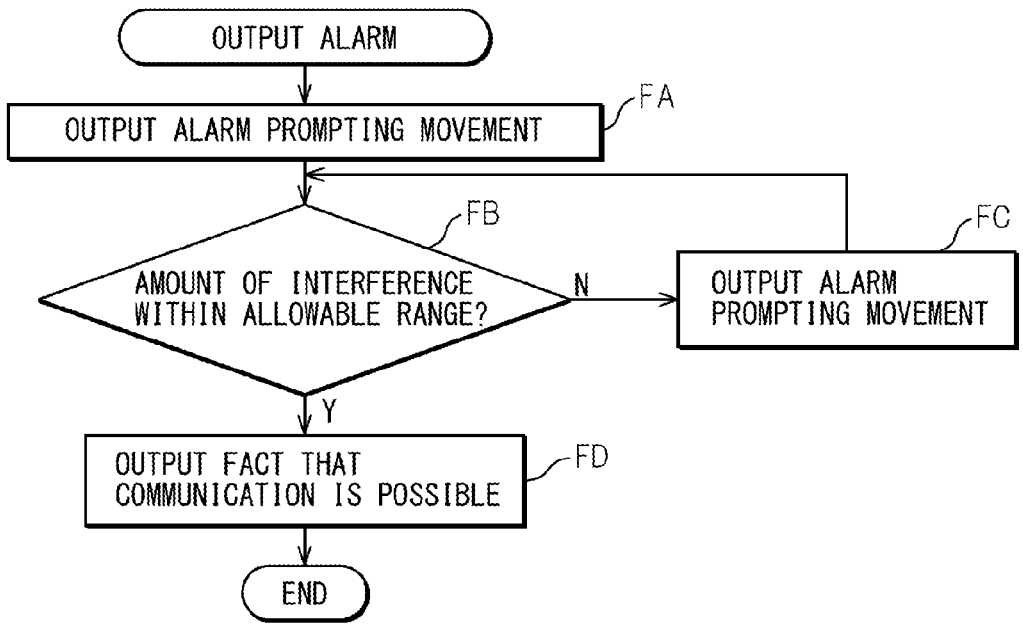

FIG. 25B is an explanatory view of the processing in the operation EG. Note that, in another embodiment, the following operations FA to FC may also be steps.

In the operation FA, the interference judging unit 23 makes the alarm unit 24 output a predetermined alarm message which prompts movement of the user. In the operation FB, the interference judging unit 23 judges if the amount of interference is in the allowable range. When the amount of interference is in the allowable range (operation FB: Y), the processing proceeds to the operation FD. When the amount of interference is not in the allowable range (operation FB: N), the processing proceeds to FC.

In the operation FC, the interference judging unit 23 makes the alarm unit 24 output a predetermined alarm message which prompts movement. After that, the processing returns to the operation FB. In the operation FD, the interference judging unit 23 makes the alarm unit 24 output a predetermined notification message which notifies that communication has become possible. After that, the processing is ended.

According to the present embodiment, when avoiding the interference, which is suffered by the mobile station 3, is difficult, the user can be guided to a location where the mobile station 3 is not suffered from interference, so the user friendliness can be improved.

All examples and conditional language recited hereinafter are intended for pedagogical purposes to aid the reader in understanding the principles of the invention and the concepts contributed by the inventor to furthering the art, and are to be construed as being without limitation to such specifically recited examples and conditions. Nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

1 communication system
2, 2a, 2b base station
3, 3a, 3b mobile station
54 registering unit
56 controlling unit
57 interference judging unit

What is claimed is:

1. A base station comprising:
an interference judging unit which judges if an amount of interference between the base station and a peripheral cell in partial wireless resources, allocated by the base station to a mobile station, is in an allowable range, wherein available wireless resource is divided into a plurality of the partial wireless resources which include at least one unused partial wireless resource,
a registering unit which receives a reception operation for registering mobile stations in a storage device which the base station can access, and
a resource control unit which allocates the partial wireless resources to only mobile stations registered at the registering unit and changes the partial wireless resources allocated to the registered mobile stations to other partial wireless resources, when the amount of interference is not in the allowable range.

2. The base station according to claim 1, wherein the resource control unit provides unused partial wireless resources which are not allocated to the mobile station, in the partial wireless resources designated in advance as the range of wireless resources which the resource control unit can allocate to the mobile station.

3. The base station according to claim 2, wherein the resource control unit changes the partial wireless resources to be allocated to a mobile station so that the unused partial wireless resources increase, when the amount of interference is not in an allowable range.

4. The base station according to claim 3, wherein, when the amount of interference is not in an allowable range at one of the uplink and downlink, the resource control unit provides the unused partial wireless resources to the other of the uplink and downlink.

5. The base station as set forth according to claim 2, further comprising a designating unit which receives an input for designating the amount of the unused partial wireless resources.

6. The base station according to claim 1, wherein
a timing signal generating unit which generates a periodic timing signal, which is synchronized with the base station of the peripheral cell, is provided, and
said resource control unit changes the partial wireless resources in synchronization with said timing signal, when said amount of interference is not in an allowable range.

7. The base station according to claim 1, wherein said resource control unit randomly determines the allocation of the partial wireless resources which are allocated to the mobile station.

8. A communication system including a base station and a mobile station, wherein
the base station comprising:
a first interference judging unit which judges if an amount of interference which occurs between the base station and a peripheral cell in partial wireless resources, allocated by the base station to a mobile station, is in an allowable range, wherein available wireless resource is divided into a plurality of the partial wireless resources which include at least one unused partial wireless resource;
a registering unit which receives a reception operation to register mobile stations in a storage device which the base station can access; and
a resource control unit which allocates the partial wireless resources to only mobile stations registered at the registering unit and changes the partial wireless resources, allocated to the registered mobile station, to other partial wireless resources, when the amount of interference is not in the allowable range, and
the mobile station comprising:
a second interference judging unit which judges if an amount of interference which occurs between the base station and a peripheral cell in the partial wireless resources, allocated to the base station, is in an allowable range; and
an alarm unit which outputs an alarm message when a time period, where the amount of interference is not in an allowable range, exceeds a threshold value.

9. A method of allocating wireless resources, the method comprising:
receiving, in advance, a registration operation to register mobile stations which are permitted to be connected to a base station and registering the mobile stations in a storage device which the base station can access,
measuring the amount of interference which occurs between the base station and a peripheral cell in partial wireless resources which are allocated by the base station to a mobile station, wherein available wireless resource is divided into a plurality of the partial wireless resources which include at least one unused partial wireless resource,
allocating the partial wireless resources to only mobile stations registered in the storage device, among the mobile stations in a cell formed by the base station, and
changing the partial wireless resources allocated to the registered mobile stations to other partial wireless resources, when the amount of the measured interference is not in an allowable range.

10. A base station comprising:
an interference judging unit which judges if an amount of interference between the base station and a peripheral cell in wireless resources, allocated by the base station to a mobile station, is in an allowable range,
a registering unit which receives a reception operation for registering mobile stations in a storage device which the base station can access, and
a resource control unit which allocates a wireless resource to only mobile stations registered at the registering unit and changes the wireless resources allocated to the registered mobile stations, when the amount of interference is not in the allowable range,
wherein the resource control unit provides a range of non-use which is not allocated to the mobile station, in a part of the range designated in advance as the range of wireless resources which the resource control unit can allocate to the mobile station.

* * * * *